(12) United States Patent
Anschel et al.

(10) Patent No.: US 7,688,247 B2
(45) Date of Patent: Mar. 30, 2010

(54) FIBER LASER BASED DIRECTIONAL INFRARED COUNTERMEASURE (DIRCM) SYSTEM

(75) Inventors: Israel Anschel, Kfar Saba (IL); Vladimir Krupkin, Rishon LeZion (IL); Andrew Lovett, Kfar Saba (IL); Zachary Sacks, Modi'in (IL); Doron Chomski, Rehovot (IL); Zeev Schiffer, Petach Tikva (IL); Kuti Grossman, Yaavne (IL); Elena Luria, Kiryat Ono (IL); Doron David, Mobile Post Ashkelon (IL); Itamar Shoshan, Yehud (IL)

(73) Assignee: ELOP Electro-Optical Industries Ltd., Rehovot (IL)

( * ) Notice: Subject to any disclaimer, the term of this patent is extended or adjusted under 35 U.S.C. 154(b) by 580 days.

(21) Appl. No.: 10/558,992

(22) PCT Filed: Jun. 3, 2004

(86) PCT No.: PCT/IL2004/000475
§ 371 (c)(1),
(2), (4) Date: Oct. 27, 2006

(87) PCT Pub. No.: WO2004/109323
PCT Pub. Date: Dec. 16, 2004

(65) Prior Publication Data
US 2007/0206177 A1    Sep. 6, 2007

Related U.S. Application Data

(60) Provisional application No. 60/539,599, filed on Jan. 29, 2004.

(30) Foreign Application Priority Data

Jun. 4, 2003    (IL)    ........................ 156313
Jul. 13, 2003   (IL)    ........................ 156897

(51) Int. Cl.
G01S 7/495    (2006.01)
H04K 3/00     (2006.01)
G01S 17/00    (2006.01)
F41G 7/00     (2006.01)

(52) U.S. Cl. ........................ 342/14; 342/13; 244/3.1; 455/1; 89/1.11

(58) Field of Classification Search .................. 244/3.1; 342/13–20, 175, 195; 455/1; 89/1.11; 398/118, 398/121, 125, 173, 178
See application file for complete search history.

(56) References Cited

U.S. PATENT DOCUMENTS 3,808,428 A * 4/1974 Barry et al. ................. 398/125
(Continued)

FOREIGN PATENT DOCUMENTS

DE    44 02 855 A1    3/1995
(Continued)

OTHER PUBLICATIONS

Busse L. E. et al: "Mid-infrared power delivery through chalcogenide glass cladded optical fibers" SPIE, vol. 2714, 1996, pp. 211-221.
(Continued)

*Primary Examiner*—Bernarr E Gregory
(74) *Attorney, Agent, or Firm*—Heslin Rothenberg Farley & Mesiti P.C.

(57) ABSTRACT

A DIRCM (Direct IR Counter Measures) system includes a detection and warning apparatus for detecting a missile that might pose a threat on the platform to which said system is allocated, and for generating a warning of its existence. The warning may include data that enable the calculation of the expected direction from which the missile is approaching. The DIRCM system may also include an acquisition device for performing acquisition of the approaching missile in accordance with the data provided by the detection and warning apparatus, and issuing data that may enable the calculation in real time of the updated position of the missile, a fiber laser for generating a laser beam, and a motion and aiming enabled turret, coupled with the laser, for directing the laser beam onto the approaching missile. The laser beam may be generated in accordance with the missile's updated position as calculated based on data received from the acquisition device, and processing means, linked to the detection and warning apparatus and also to the acquisition device, the laser and the turret.

54 Claims, 17 Drawing Sheets

U.S. PATENT DOCUMENTS

| | | | | |
|---|---|---|---|---|
| 4,439,767 | A | * | 3/1984 | Hefley et al. .................. 342/14 |
| 5,136,295 | A | * | 8/1992 | Bull et al. ..................... 342/15 |
| 5,260,820 | A | * | 11/1993 | Bull et al. .................. 398/125 |
| 5,600,434 | A | | 2/1997 | Warm et al. |
| 5,662,291 | A | * | 9/1997 | Sepp et al. ................... 89/1.11 |
| 6,359,710 | B1 | * | 3/2002 | Takken et al. ............... 398/178 |
| 6,369,885 | B1 | | 4/2002 | Brown et al. |
| 6,587,486 | B1 | | 7/2003 | Sepp et al. |
| 2002/0153497 | A1 | | 10/2002 | Pepper |
| 2002/0154377 | A1 | | 10/2002 | Pepper |
| 2003/0021529 | A1 | | 1/2003 | Koplow |

FOREIGN PATENT DOCUMENTS

| | | | |
|---|---|---|---|
| DE | 197 45 785 A | | 4/1999 |
| EP | 1 241 486 A | | 9/2002 |
| FR | 2318453 A1 | * | 2/1977 |

OTHER PUBLICATIONS

Busse L E et al: "Mid-IR high power transmission through chalcogenide fibers: current results and future challenges" SPIE, vol. 2966, 1997, pp. 553-563.

McManamon P F et al: "Suggestions for low cost multifunction sensing" Aerospace Conference, 1998 IEEE Snowmass at Aspen, CO, USA Mar. 21-28, 1998, New York, NY, USA,IEEE, US, pp. 283-307.

Sanghera J S et al: "Active and passive chalcogenide glass optical fibers for IR applications: a review" Journal of Non-Crystalline Solids, North-Holland Physics Publishing. Amsterdam, NL, vol. 256-257, Oct. 2, 1999, pp. 6-16.

Sanghera J S et al: "Applications of Chalcogenide Glass Optical Fibers at NRL" Journal of Optoelectronics and Advanced Materials, vol. 3, No. 3, Sep. 2001, pp. 627-640.

Sanghera J S et al: "IR fiber optics development at the Naval Research Laboratory" Proceedings of the SPIE, vol. 3950, 2000, pp. 180-185.

Shaw L B et al: "Development of IR Emitting Infrared Fibers at the Naval Research Laboratory" Proceedings of SPIE, vol. 4366, 2001, pp. 90-95.

* cited by examiner

FIBER LASER BASED DIRECTIONAL INFRARED COUNTERMEASURE (DIRCM) SYSTEM

CROSS REFERENCE TO RELATED APPLICATIONS

This application is a 371 filing of International Application PCT/IL2004/000475 filed on Jun. 3, 2004 and published in English as International Publication No. WO 2004/109323 on Dec. 16, 2004, and claims priority from Israeli patent application no. 156313 filed Jun. 4, 2003, Israeli patent application no. 156897 filed Jul. 13, 2003 and U.S. application No. 60/539,599 filed Jan. 29, 2004, all of which applications are hereby incorporated by reference herein in their entirety.

FIELD OF THE INVENTION

The present invention relates to the field of jamming systems that are used against thermally guided missiles, in general, and more directly to systems and methods known as Direct IR Counter Measures (DIRCM's) in particular.

BACKGROUND OF THE INVENTION

The continuing development of ever more lethal and sophisticated homing heads relying on reception of the heat radiation emanated by motorized moving platforms (for example, aircraft, vehicles, armored vehicles, ships, etc.) highly endanger these transportation means that are exposed to the heat sensitive homing missiles, as all these means are inherently sources of radiated heat. Thus for example, surface to air missiles are by now a common threat.

In response to the formation and development of the dangers and threats described above, jamming systems and other systems, aimed at interfering and disrupting the homing head from its target and deflecting it away from its path, have also been developed and improved.

Thus, for example, some jamming systems installed in aircraft against ground to air missiles are known and operative. These systems may detect and locate in real time the launching of a missile from the ground—for example, relying on a thermal system that continuously scans the ground surface from the air, discovers the thermal signature of a missile being fired, and, as the targets themselves generate a typical IR radiation, they may activate against the incoming homing head, jamming means that are meant to deflect the missile from its path. For example, flares may be launched from the attacked target and may be scattered around the attacked target, so that the heat emanated from the target is said to "confuse" the homing head of the approaching missile and cause the missile to swerve from its original path, which originally led towards the heat radiated from the target engines.

Other examples, well known and recognized, are the "directional jamming systems", for example, systems that activate a directional jamming means against the incoming missile, such as a laser beam or an intense light that aims to disrupt the homing head operation. Such systems are known as Direct IR Countermeasures (hereinafter "DIRCM").

DIRCM systems based on aiming a laser beam towards the approaching missile, are described inter alia in U.S. Pat. No. 5,600,434 of Warm et al., and in U.S. Pat. No. 6,369,885 of Brown et al. The DIRCM systems known today are subject to many disadvantages that may result from the inherent constraints due to the platforms' limitations, namely space, weight, and environmental conditions dictated by the platform on which the system is installed. It is to be understood that the system is to continuously track the approaching missile, and is to quickly aim the radiated beam toward the approaching missile while the platform housing the beam generation source is itself moving, and may be located on a platform that may be neither steady nor stabile. In other words, the DIRCM system is often integrated in a closed structure that may be exposed to probably very unfavorable environmental conditions, that may be far from optimal for successfully carrying out the designated mission.

Thus, for example, integrating a DIRCM system in a platform such as an airliner, may require performing modifications of the airliner's body. For example, such modifications may include adding a movable turret somewhere outside its outer fuselage, so that it will be possible to deflect it sideways as well as change its elevation angles, for tracking threatening missiles aimed at the plane. Such a turret, for enabling monitoring of the approaching missile, may be subject to disturbances and constraints, such as the movement of the plane including change of course, shocks, vibrations, etc., making the optimal tracking maneuvers rather tedious if at all executable. Moreover, the confined quarters in a passenger aircraft may require a system with limiting packaging requirements, miniature devices and modules, and all this with minimum interference with the carrying out of the craft's original task: flying safely and efficiently.

DIRCM systems that are known today may implement solid-state lasers that require the beam to be transferred from the laser source via mechanic-optical cavities (i.e. elbows) with gimbaled mirrors. Naturally, such elements are complex and sensitive to shocks and vibrations, in such a way that may cause beam intensity and quality loses.

Thus, there is a need for a DIRCM system that may provide an easy and convenient installation approach, upon a myriad of different mobile platforms, e.g. aircraft, tank or ship etc. Such a system may be required to have the capability to exploit limited accessible and available free spaces in carrying platforms. Moreover, such systems may require dynamic assemblies with modules of minimal weight and volumes that may be moved in multiple directions in order to perform the required tracking of the approaching missile, to afford stabilized and accurate tracking of the missile. Such a DIRCM system may further be required to be a robust system designed so that its structure may contain a limited number of modules and components that are sensitive or susceptible to harsh environmental conditions.

SUMMARY OF THE INVENTION

The present invention may include features that provide solutions that help alleviate at least the difficulties inherent in the cited DIRCM systems discussed above. This may be achieved, according to some embodiments of the present invention, by implementing a Fiber Laser means in the DIRCM system.

Using a fiber laser means, according to some embodiments of the present invention, may enable improved operation characteristics to the tracking and jamming task. For example, the fiber laser means may provide high system efficiency while reducing energy losses in the mobile platform in which it is installed, may facilitates the chore of packaging the system into the limited available free space in the mobile platform that may carry it, may facilitate the adjustments of the optical components in the laser beam routing system, may prevent exposure to optical problems that in other systems may result from the platforms movements and ensuing vibrations and shock, may require relatively few optical components as compared to existing nonfiber laser systems, and/or may provide a more rigid and stable optical unit, and less electrical power and cooling requirements, due to the higher efficiency of the fiber lasers.

In one embodiment of the present invention, the fiber laser means may include a SW ZBLAN fiber laser means for providing a first wavelength beam; and an LW silica fiber laser that directly pumps a ZGP (Zinc Germanium Phosphide) OPO (Optical Parametric Oscillator) array for providing a second wavelength beam. In a further embodiment of the present invention, the above mentioned silica fiber pumped OPO, is pump-polarization independent.

Furthermore, some embodiments of the present application describe additional fiber based laser means applicable for the DIRCM system, for example, Yb and Er/Yb fiber based generators of a variety of wavelengths.

In addition, some embodiments of the present application describe a collinear multi-spectral high brightness source comprised of one or more bands of laser radiation produced by the DIRCM's fiber laser means as the jamming beam of the system.

Furthermore, some embodiments of the present application may provide for implementation of a plurality of jamming bands to operate jointly, independently or sequentially to each other. Thus, for example, in a case of a multi band system, simultaneous multi band jamming capability or any single band jamming capability may be provided.

BRIEF DESCRIPTION OF THE DRAWINGS

The present invention will be better understood and appreciated more fully from the following detailed description, taken in conjunction with the drawings, in which.

Figure 1:
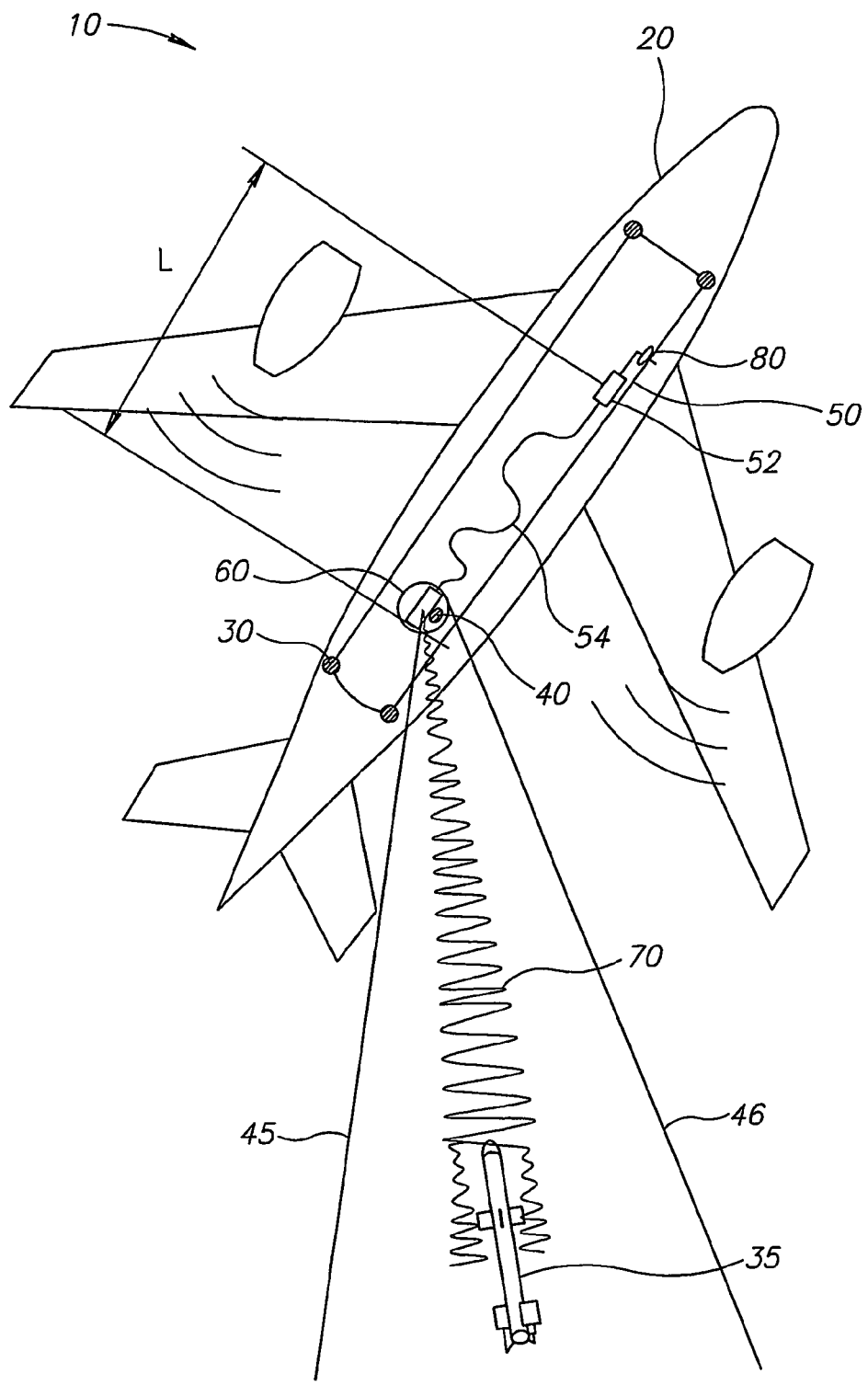
FIG. 1 illustrates an example of a DIRCM system installation in a passenger airliner, according to some embodiments of the present invention.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The phrase "Direct IR Counter Measures" or "DIRCM's", as used herein, may refer to various technologies and/or systems for countering attacks on mobile platforms based on, for example, IR based technologies, but not limited to IR based technologies. For example, a DIRCM system, according to some embodiments of the present invention, may utilize visible light or visible laser technologies, or other elements from the electromagnetic spectrum, besides IR radiation.

Reference is now made to FIG. 1. FIG. 1 constitutes an illustration of the manner of installing a Direct InfraRed Counter Measures (DIRCM's) system 10 in a platform that in this case is a passenger airliner 20, according to some embodiments of the present invention.

System 10 may comprise detection and/or warning means 30. The detection and/or warning means may serve to detect airborne vessels, for example, missiles 35 that might constitute a threat to a mobile platform, for example, a passenger aircraft 20. Detection and/or warning means may serve to generate a warning of a threatening airborne vessel. Such a warning may include data that may enables the calculation of the anticipated direction of approach of the missile to the aircraft, optionally in real time.

Detection and warning means 30 may include at least part of a "Missile Warning System" (MWS), as is known to a professional skilled in the art. A system of the MWS type might be based on using various sensors, such as those of the IR, UV, or radar types, or any combination of sensors from these types.

In addition, system 10 may comprise acquisition means 40. The acquisition means serve for sensing and detecting missile 35 in accordance with the data given by the detection and warning means 30. The data received from acquisition means 40 may enable the system to calculate the updated position of the approaching missile 35, optionally in real time.

Any professional skilled in the art would understand that the acquisition means 40 might be based on exploiting an FLIR device.

In accordance with the present invention, a laser means 50 may be a fiber laser type, as described below with reference to FIG. 2. Laser means may employ non-visible and/or visible light energy. Laser means 50 may include all elements that may be utilized to generate laser energy and transfer the laser energy to turret 60. In other embodiments a pump laser may be outside the turret and the wavelength converter may be on or in the turret. In other embodiments, one or more elements of laser means 50, or other combinations of elements, may be outside the turret.

In addition to the components described above, system 10 may comprise a movable turret 60 that may be aimed and directed as required. This turret means 60 may be coupled with the fiber laser means 50 for directing the laser beam 70 towards the approaching missile 35 upon establishing a line of sight with the missile. This would be accomplished in accordance with the updated position of missile 35 that may be calculated using the data that was submitted from acquisition means 40. An example of a field of view of a camera connected to turret 60 is indicated by lines 45 and 46. Other fields of view may be utilized.

Any professional skilled in the art would understand, that laser beam 70 that is generated by the fiber laser means 50 and that is directed, in its capacity of a jamming beam towards missile 35, might be (if preferred) a narrow (high brightness) multi-spectral IR Beam. One embodiment of a feasible configuration of a fiber laser that is capable to generate a suitable narrow multi-spectral IR beam is described below, when referring to the details of FIGS. 7 and 8.

Processor means 80 may be coupled—for the sake of controlling the system and performing the data processing—to one or more of the following components: detection and warning means 30, acquisition means 40, fiber laser means 50, and the turret means 60.

The usage of fiber laser means may enable positioning of laser generator assembly 52 (described below) in one or more locations, while routing the beam to a selected distance (as marked by letter "L" in the drawing), using an array of one or more flexible fibers 54, or other suitable means. Thus, it may be viable to exploit a given free space in aircraft 20 for positioning laser generator 52 as a stand alone component in one place, while routing the laser energy via an array of flexible fibers 54 towards the turret 60. This may be achieved without having to be subjected to a significant loss of energy nor of a significant deterioration of beam quality associated with free space propagation.

Any professional skilled in this field would understand, that the system embodied in accordance with the present invention is not restricted only and solely to being implemented in a platform that is a passenger airliner or even any other aircraft type, but rather—still in accordance with the present invention—it may be installed on any other mobile platform—such as a vehicle, a tank, or a vessel, where it would be able to cope with other and different types of "homing by heat" missiles, where heat refers to any wavelength longer than visible light (700 nm). For example, the system may be installed in a tank where it would be intended to transmit jamming beams against a ground based anti tank missile, or homing armament fired at the tank from the air, and so on.

Also, any professional skilled in this field would understand, that the DIRCM system may be mounted on one platform while allocated to jam thermally guided ammunition approaching other neighboring platform in its vicinity as well.

In other embodiments of the present invention, all or part of the components of the DIRCM system may be implemented within a single unit, for example, within turret means 60.

Figure 2:
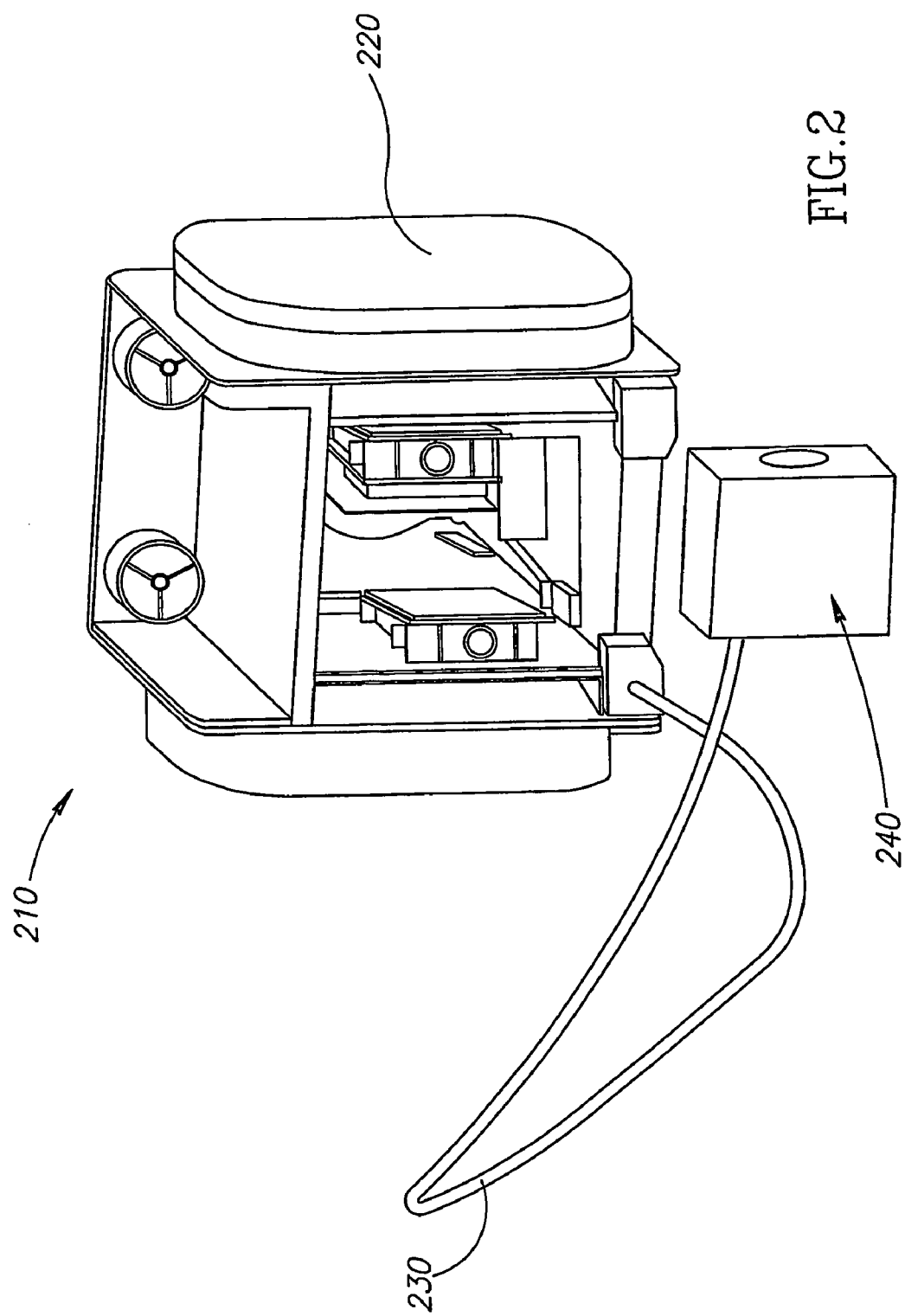
FIG. 2 is a general illustration of diverse assemblies that may form a fiber laser means, according to some embodiments of the present invention.

Reference is now made to FIG. 2. FIG. 2 is an illustration of the diverse assemblies of the fiber laser means 210 according to some embodiments of the present invention.

As cited above, one example of a feasible configuration of a fiber laser means that generates, in accordance with an embodiment of the present invention, a multi-spectral IR beam. This will be elaborated upon below when referring to the details of FIGS. 7 and 8.

Fiber laser means 210 may include a laser generator 220, which may include an electro-optic assembly with one or more fiber laser devices, as well as electronic components (dubbed "electronic means") and cooling means. Selecting a fiber laser implementation may enable the freedom of positioning the laser generator outside the free moving turret. (See component 60 in FIG. 1.) A typical laser generator, for example, might weigh approximately 40 kg and that may require an area of approximately 450 mm squared, then any professional skilled in the art would appreciate that a substantial alleviation of the requirements is thus achieved, particularly from the point of view of the accurate tracking movement and essential stabilization aspects regarding the turret's motion and directions.

Fiber laser means 210 may include, in addition, an array of either single or plurality of flexible fibers 230. As stated, using fiber optics as the means for routing the laser energy provided by generator 220, imparts the capability to deliver the energy to rather long distances without exposing the system to unfavorable energy losses while maintaining the high quality of the laser beam. Such an energy preservation capability is not present when the energy is routed via a system of lenses, mirrors, and/or other optical elements because of the inherent losses in each element and various surfaces. In addition, such a lens and/or mirror system imposes severe requirements regarding the needed accuracy when adjusting and directing the beam, which is further impeded by the obstructions resulting from the system's vibration, shock, air particulates, and other environmental influences.

Fiber laser means 210 may include a laser head unit 240, linked to the fiber array 230. Laser head unit 240 may comprise a wavelength converter and an optical sub assembly (not shown). Laser head unit 240 may be a compact unit in both its dimensions and lightweight. A typical fiber laser head unit might weigh as little as approximately 1.5 kg, and its packaging requires a relatively small box or cabinet, provided by, for example, a rectangular box whose sides are just 150.times.150.times.100 mm. Laser head unit 240 may be included inside or on turret 60, or may be outside of turret 60.

Therefore, with such characteristics as described above, any professional skilled in the art would appreciate, that for implementations such as described in the present invention, a fiber type laser may provide inherent advantages in comparison to the solid state laser, including higher efficiency (a factor of 2 to 3), stability and constructional ruggedness (due to its construction that is based on a fiber and not an array of mirrors and lenses), the convenience of packaging it and locating it in given limited spaces, simple cooling systems, high reliability and straightforward improvement and upgrading options of its wavelengths, power, and transmission modes.

The implementation of fiber laser into DIRCM systems provides for better flexibility in terms of the required jamming power. A fiber laser integrated DIRCM system is, by definition, capable of providing higher output power levels in comparison to the known DIRCM systems, which are based on solid-state lasers for a given electrical power, size, and weight. The inherent flexibility impart by the fiber laser does not require substantial changes in the system's overall architecture in order to get a considerable output energy, thereby, providing the DIRCM system with a wide variety of means to cause the approaching thermally guided ammunition not to hit its target.

Fiber lasers used, according to some embodiments of the present invention, may include fiber-based combiners. In other embodiments bulk elements may be used. In further embodiments a combination of fiber combiners and bulk elements may be used.

Fiber laser means 210 may include one or more fiber types, including, for example, CorActive's Chalogenide fiber. In other embodiments Th, Dy and/or Pr dopings may be used for generating, for example, 3-5 um radiation directly without an OPO.

Reference is now made to FIGS. 3 to 6. These drawings present, by means of a schematic sketch, diverse packaging configurations of the various means that may be installed in the movable turret means 60 of the system 10, according to some embodiments of the present invention.

Any professional skilled in the art would understand that the turret means required for this system, namely a movable turret that may also be directed at will in desired directions, must provide very fast response as well as accurate aiming to the approaching missile. A gimbaled turret would provide the required characteristics as those used in observation and surveillance systems, but with much higher dynamics. As a general rule, reducing the weight and the volume of the components that are mounted on the rotatable part of the turret greatly facilitates—from the opto-mechanical point of view—the task of quickly and accurately driving and stabilizing the turret.

Hence, any professional skilled in the art would appreciate the suggested use of fiber optics embodied in the system implemented in accordance with the present invention, namely employing a fiber laser that in whichever configuration of the system in accordance with the present invention, it is feasible to position the heaviest and bulkiest part of the laser means, that is the laser generator, outside the rotatable component of the turret means and even at a certain distance away from it (wherein, it is possible to transfer the energy from distant generator towards the turret and the laser head via an array of fibers). Reducing the weight and minimizing the size of the moving elements embedded in the movable turret means may also provide for a erectable/retractable type of turret means that may be hidden while the platform is not under threat.

Figure 3:
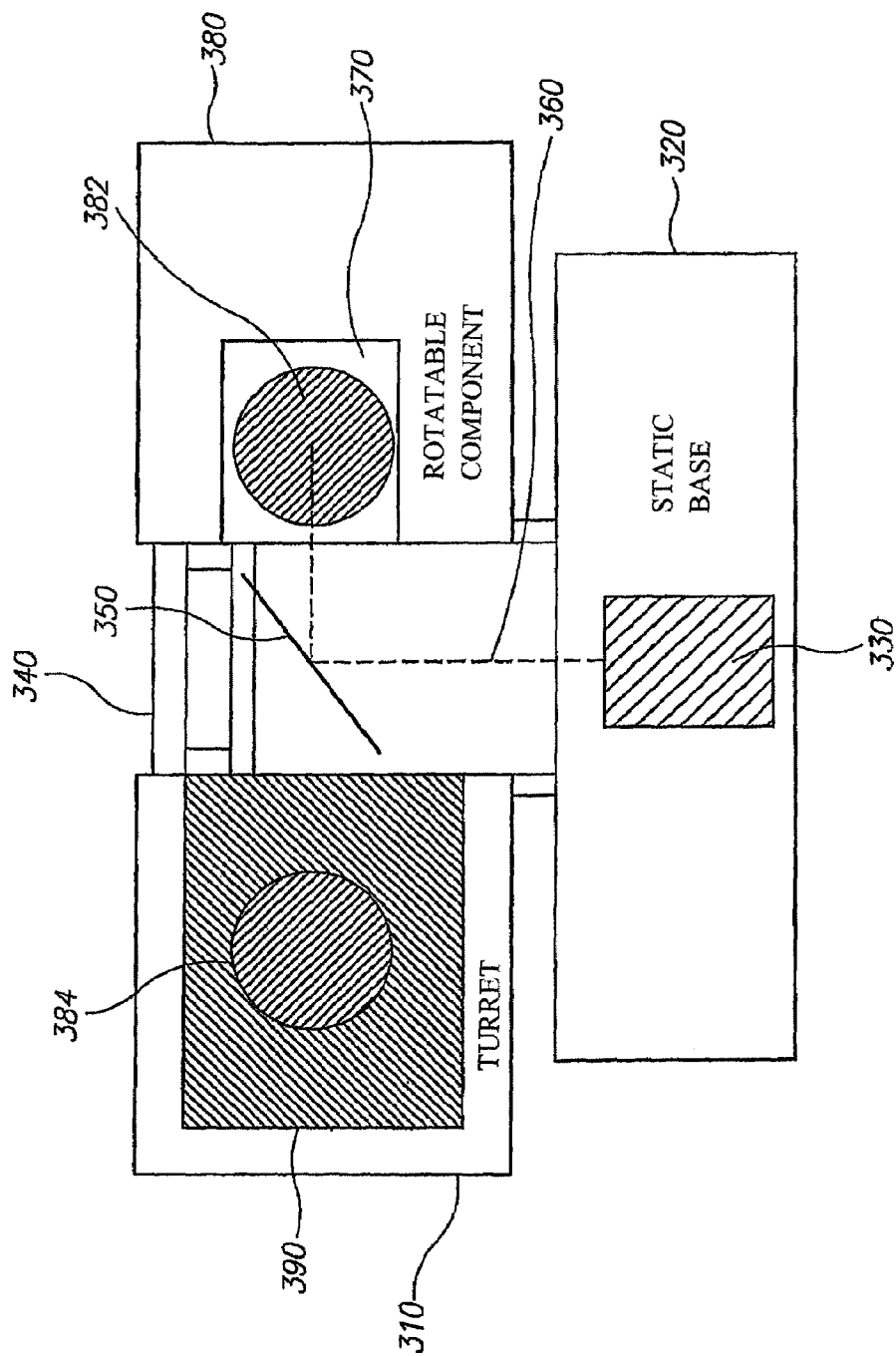
FIGS. 3 to 6 are schematic illustrations of different packaging configurations of the various components and means mounted on a movable and rotatable turret means, according to some embodiments of the present invention.

One layout configuration of turret means 310 is presented in FIG. 3. This depicts a configuration of separated optical openings, wherein the laser head is located at the fixed (static) base 320.

In accordance with this configuration, a laser head unit 330, which is linked to a fiber array (not illustrated), may be located at the static base 320 of the turret 60. An optical mirror means 350 may be mounted on the rotatable component 340 of the turret. Optical mirror 350 may cause a deviation of laser beam 360 towards a main mirror means 370, located on the rotatable component (at its other axes) 380 of the turret. Main mirror means 370 may constitute the first optical opening 382, which may direct the laser beam towards the approaching missile. The other optical opening 384, may be set parallel to and adjacent to the first optical opening 382, upon the same rotatable component 380, and may serve the acquisition function of the system (in the illustrated example—based on FLIR camera 390).

Figure 4:
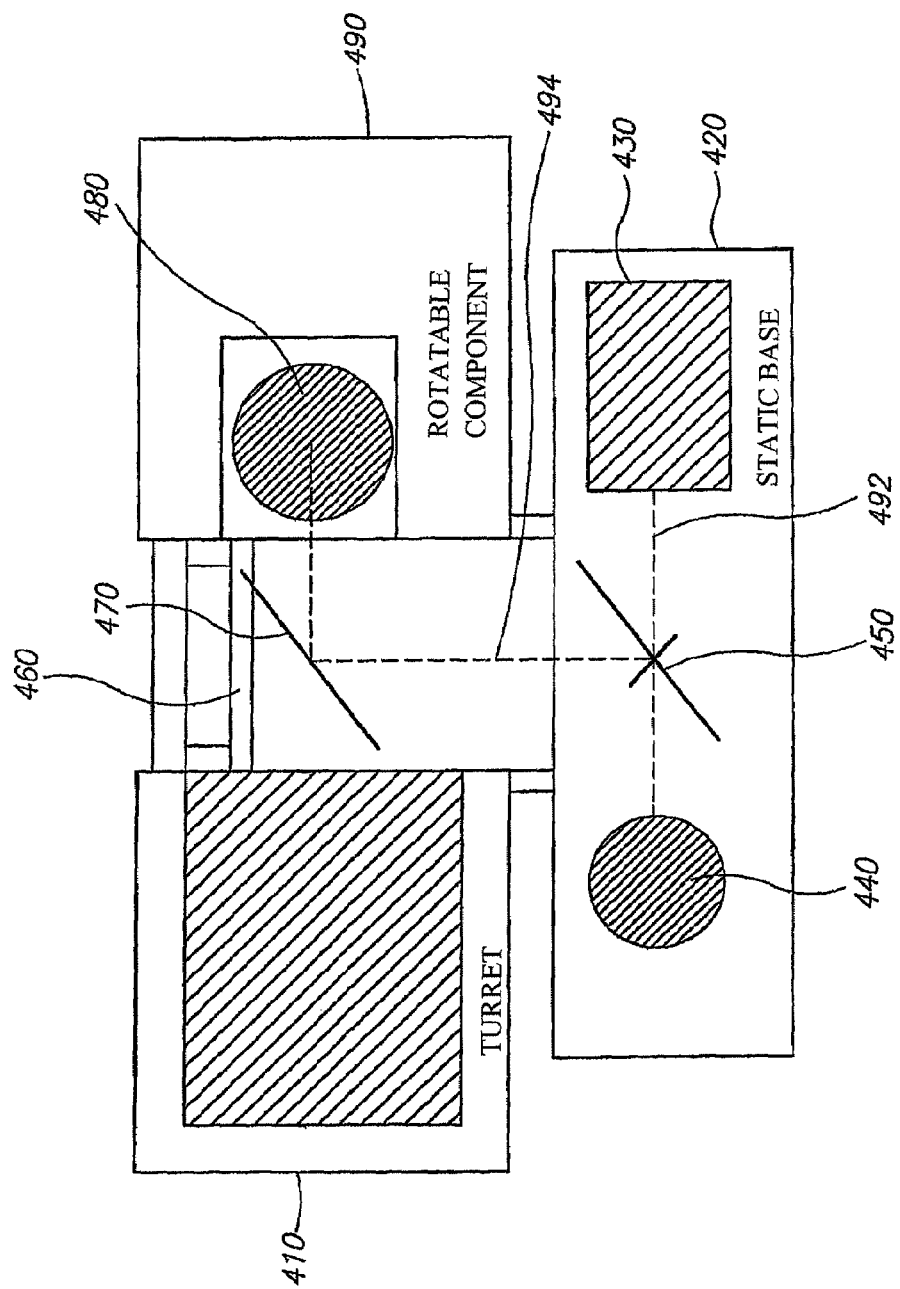

An additional layout configuration option of turret means 410 is presented in FIG. 4. This layout presents a joint optical opening configuration, wherein both the laser head and the acquisition means may be located at the fixed (static) base of the turret.

In accordance with this configuration, the following are located upon the static base 420 of the turret: the laser head unit 430 (that is linked to a fibers array which is not illustrated); the acquisition means of the system (in the illustrated example—a FLIR camera 440), and a mirrors system 450 which may be coupled to the two. Optical mirror means 470 may be positioned in the rotatable component 460 of the turret, this lens—from the optical aspect—is coupled with mirrors system 450 and with main mirror means 480 that may be located at the rotatable component (on its other axes) 490 of the turret. Main mirror means 480 constitutes the common optical opening—and the only one—in this configuration. Laser beam 492 may emanate from laser head unit 430, and may be lead towards main mirror means 480 over the same optical axis 494, on which the optical images received by main mirror means 480 are conducted in the opposite direction, towards FLIR camera 440. Thus, for example, the optical images are transferred in a ring-like (circular) pattern whereas the laser beam 494 may be in the center. Any professional skilled in the art would understand that it is also possible to gate the action of the FLIR camera 440 in synchronization with the laser operation, in order to prevent mutual dazzling.

Figure 5:
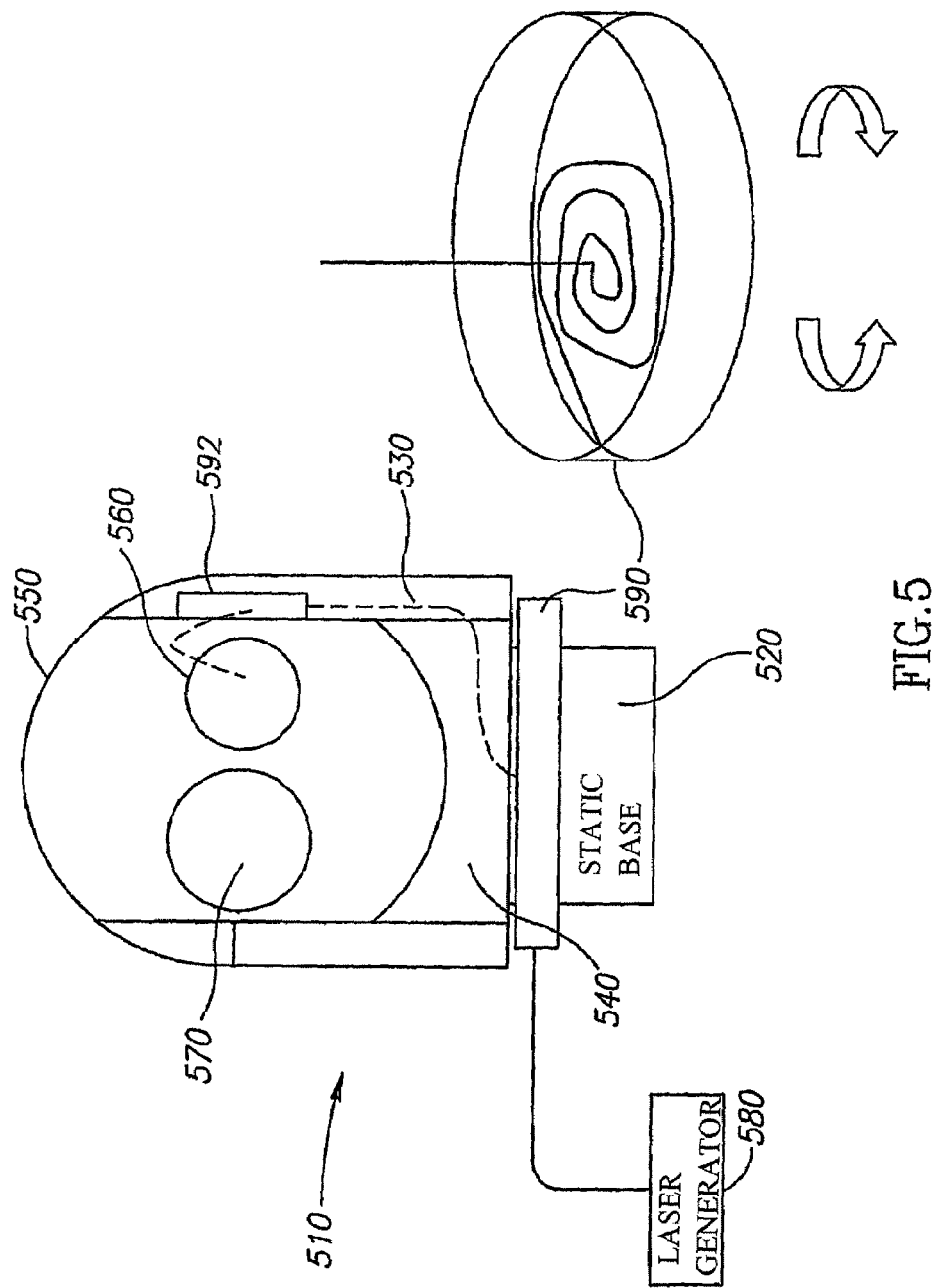

Yet another example of possible layout configuration of turret means 510 is presented in FIG. 5. In this example, it is a configuration of separate optical openings wherein both the laser head and the acquisition means are mounted in the rotating component of the turret.

In accordance with this configuration, the fibers array 530 may emanate from the static component 520 of the turret, and may extend outwards and spread into the rotatable components 540 and 550 of the turret. Evidently in this configuration, the flexible nature of the fibers may be used to lead the laser beam within the turret means and unto the laser's head means 560. Acquisition means, in the illustrated example a FLIR camera 570, may are also be mounted on the rotatable component 550 of the turret, side by side with laser's head 560.

The laser generator 580 might be located at some distant away, whereas the fibers array 530 may route the laser beam (one or more) emanating from it all the way to the turret means 510.

One possible approach to exploit the inherent flexibility provided by the fibers in order to overcome the relative motion taking place between the sub assemblies of the turret means is described in FIG. 5. Fiber rolling drums 590 and 592 may be mounted at each of the turret's 510 rotation axes. Winding the fibers in a manner resembling a flat spiral structure, such as presented in the drawing, might enable the fibers to overcome the stress that tends to be exerted by the relative motion of the turret's sub assemblies. In other embodiments fiber optic rotary joints (FORJ), as are known in the art, may be used in place of or in addition to fiber rolling drums 590 and 592.

Figure 6:
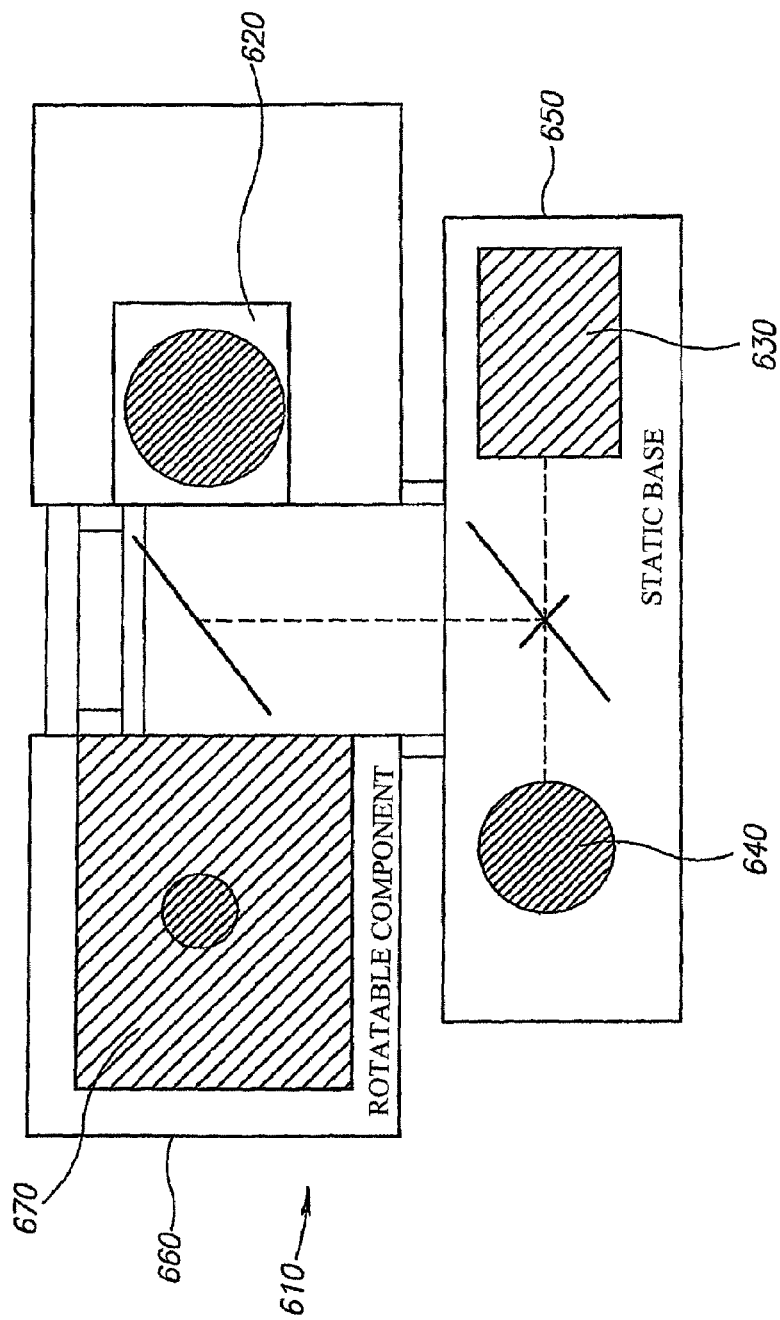

An additional layout configuration option of turret means 610 is presented in FIG. 6, which may be similar to the configuration described in FIG. 4, namely, a common optical opening 620 and wherein both the laser head 630 and the acquisition means (FLIR camera 640 in this drawing) may be located on the static (fixed) base 650 of the turret. Additionally in this layout a wide field of view type FLIR camera 670, the camera constituting part of the detection and warning means sensor of the described system, is packaged on the rotatable component 660.

Figure 7:
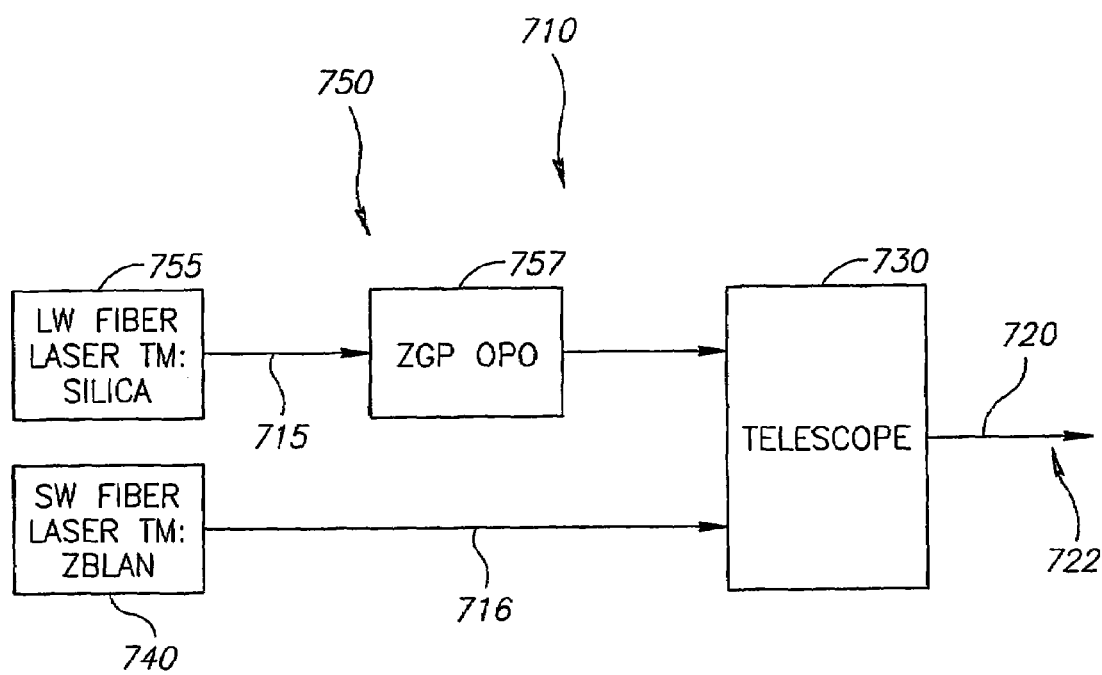
FIG. 7 presents a block diagram of an implemented of fiber laser means that is compatible with a DIRCM system that may enable production of a narrow multi-spectral IR jamming beam; according to some embodiments of the present invention.

Reference is now made to FIG. 7. This drawing presents an example, at the block diagram level, of a fiber laser means 710 that may be suitable for being implemented in the DIRCM system, according to some embodiments of the present invention, to enable generation of a narrow multi-spectral IR jamming beam 720. In the illustrated example, beam 720 may emanate from a fiber laser means source that may constitute a high average power, high brightness dual wavelength source. In the illustrated example, beam 720 may be composed of a pulsed radiation beam 716 in, for example, band I and of a pulsed radiation beam 715 in, for example, band IV. Any professional in the art would understand that the beam might be composed of different wavelengths. In addition, any professional in the art would understand that bands I, II, and IV can be operated jointly, independently or sequentially to each other. Thus, for example, in a case of a dual band system, simultaneous dual band jamming capability or any single band jamming capability may be enabled.

In addition, any professional in the art would appreciate that a DRCM system in accordance with the present invention may utilize multi band capabilities and therefore provide for simultaneous multi band jamming capability or any single band capability.

An optical telescope 730 (that constitutes a part of the laser head unit, see for example, above, where FIG. 2 is referred to, the laser head unit 240) may integrate the two beams so that the beam becomes collinear. Both wavelengths may be emitted simultaneously along the same beam path 722.

In the illustrated example, the pulsed radiation beam in band I may be generated using a short wavelength ZBLAN device that is fiber laser means 740. This item is a fiber laser that may be based on an "exotic" glass that is endowed by high transmittance capability in the broad band spectrum while attenuating minimum quantities of light.

The component of the pulsed radiation beam in band IV may be generated using a fiber laser pumped ZGP device 750, that includes a fiber laser device 755 of the long wavelength silica fiber laser type and a nonlinear crystal Zinc Germanium Phosphide (ZGP) Optical Parametric Oscillator (OPO) 757 that is directly coupled to it.

Any professional skilled in the art would understand that using the ZGP OPO imparts high conversion efficiency that may be used for low energy pulses and has excellent thermal properties that enable use with high average power. It should also be noted that in this specific embodiment, ZGP was selected because of its high nonlinear gain, good thermal and mechanical properties, and relatively high damage threshold. Other nonlinear crystals may be used: silver gallium selenide (AGSE), optically patterned gallium arsenide, periodically poled lithium niobate or tantalate that may be doped with magnesium oxide or in the stiochiometric form, silver thiogallate (AGS), etc.

Figure 8A:
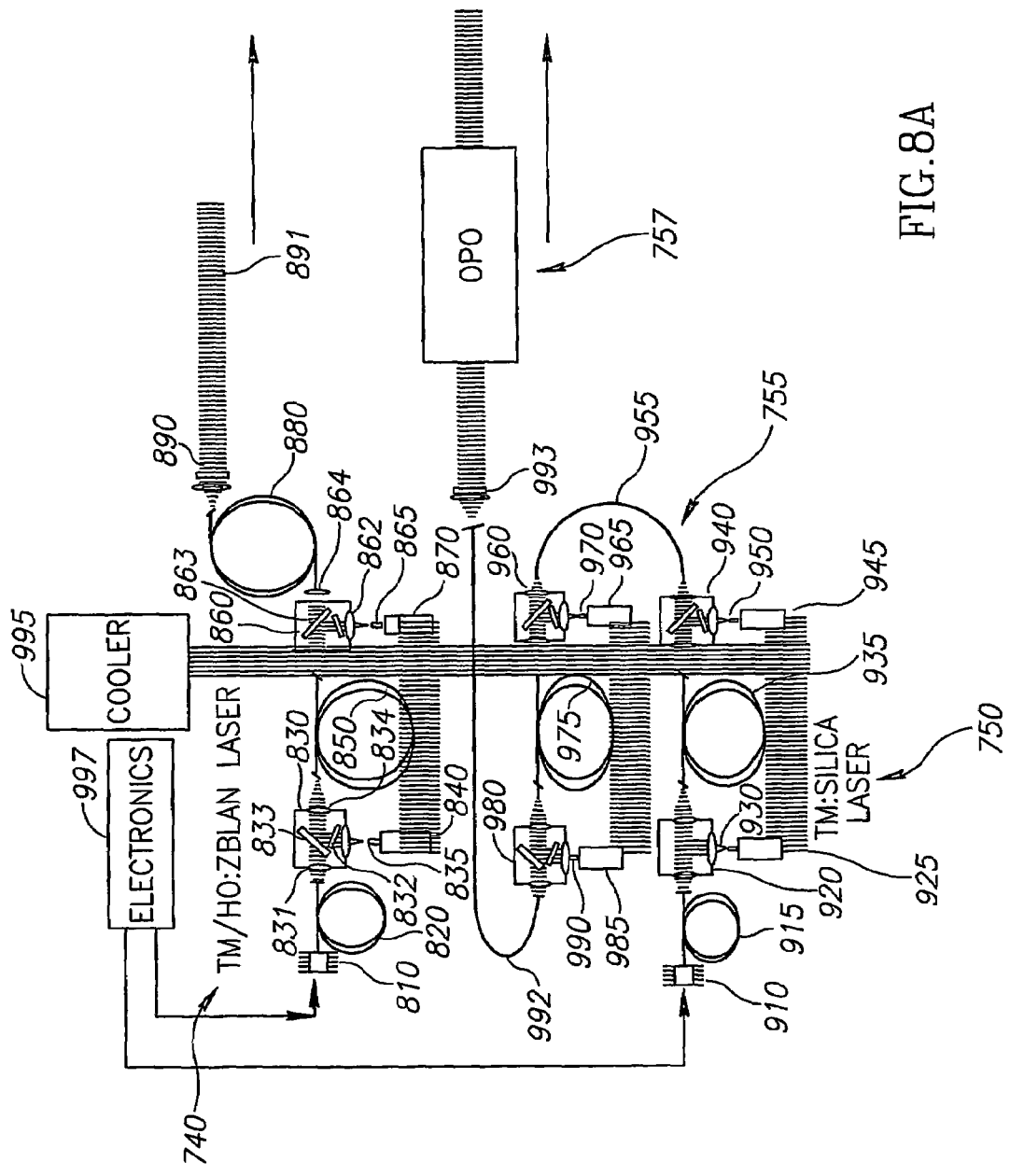
FIG. 8A is a schematic illustration of assemblies making up the fiber laser means described in FIG. 7.

Reference is now made to FIG. 8A. As cited above, FIG. 8A constitutes a schematic sketch of the assemblies making up the fiber laser means 710 that is described in FIG. 7, namely the ZBLAN fiber laser means 740 components and the silica fiber laser pumped ZGP OPO 750.

The ZBLAN fiber laser means 740 may include a single fiber laser without a diode injection, which may be modulated by the pump diodes. Such a fiber means may be implemented using Tm/Ho:ZBLAN.

In other embodiments the ZBLAN fiber laser means 740 may include an injection diode 810 that is positioned at the end of a fiber 820, which may or may not contain a fiber Bragg grating. Diode 810 and the fiber 820 may set the pulse rate, the pulse duration, and its wavelength The fiber 820 may be attached to the first beam combiner 830. First beam combiner 830 may be coupled—using a high power pumped light fiber 835—with first pumped diode 840.

First beam combiner 830 may include collimating lens 831 at the input of the combiner. Pump diode protective element 832 may be positioned at the inlet from the high power pumped light fiber 835. Dichroic mirror 833 may combine the beams and route them through double clad fiber lens 834 to ZBLAN double clad fiber 850. ZBLAN double clad fiber 850 may interconnect between the first beam combiner 830 and a second beam combiner 860 and constitutes the lasing material.

Second beam combiner 860 may be connected using high power pump light fiber 865 to second pump diode 870. Second beam combiner 860 may include double clad fiber lens 861 at the input of the combiner. Second pump diode protective element 862 may be located at the input from high power pumped light fiber 865. Dichroic mirror 863 may combine the beams and route them via output lens 864 to output fiber or, in other words, to transport fiber 880.

Transport fiber 880 may connect the second beam combiner 860 to collimator 890. Pulsed wave radiation 891 in band I, which was discussed above, may verily emanate from collimator 890.

The specific ZBLAN fiber laser means that is illustrated as the example in the drawing, may include two beam combiner assemblies (830 and 860, respectively), that may be connected, each one of them separately, with pump diodes 840 and 870, respectively. Any professional in this field would understand, that in accordance with the required power, ZBLAN fiber laser means may be composed of a larger number of combiners in series (than there are in the illustrated arrangement).

The silica fiber laser pumped ZGP OPO 750 may include a long wavelength silica fiber laser 755 device and a ZGP Optical Parametric Oscillator (OPO) 757 that the silica fiber laser pumps.

An outstanding characteristics distinguishing this described example, is the fact that a silica type fiber laser may directly pump the ZGP OPO. Any professional skill in the art would appreciate the direct pumping of the ZGP OPO by silica type fiber laser since OPO's generally require polarized light, which the fiber may or may not be, and directly pumping of an OPO by a pulsed fiber laser, which is uncommon since the pulse peak intensity is generally small. In some embodiments non-polarized light may be used.

Silica fiber laser 755 may include an injection diode 910 that is connected to a fiber 915, which may or may not contain a fiber Bragg grating. Diode 910 and fiber 915 may set the pulse rate, pulse duration, and pulse wavelength. Fiber 915 in turn may be connected to a first beam combiner 920. First beam combiner 920 may be connected to a pump diode 925 via a high power pumped light fiber 930. A silica double clad fiber 935, which amplifies the laser signal produced by 910 and 915, may interconnect the first beam combiner 920 to the second beam combiner 940. Second beam combiner 940 may be connected to a pump diode 945 via a high power pumped light fiber 950. The beam combiners 920 and 940 may provide a method of pumping the laser amplifier 935 with the laser diodes 925 and 945. A transport fiber 955 may route the beam towards a third beam combiner 960. Third beam combiner 960 may be connected to a pump diode 965 via a high power pumped light fiber 970. A silica double clad fiber 975, which may act as the second laser amplifier, inter connects the third beam combiner 960 to the fourth beam combiner 980. The beam combiners 960 and 980 may provide a method of pumping the laser amplifier 975 with the laser diodes 985 and 965. Fourth beam combiner 980 may be connected to a pump diode 985 via a high power pumped light fiber 990. A transport fiber 992 may route the beam towards an output collimator 993, and thence to the ZGP OPO 757.

A cooling assembly 995 may perform the required cooling of all the pump diodes in the system, fibers, ZGP, and/or mechanical assembly, and electronics assembly. An electronics assembly 997 may control the operation of the whole system.

The specific silica fiber laser means that are illustrated in the drawing may include four beam combiners assemblies that are interconnected, each one with a respective pump diode. Any professional skilled in the art in this field would understand, that, in accordance with the required power, the silica fiber laser means might be composed of a larger number of combiner—pump diode pairs connected in series, or alternatively, of only a single pair.

Thus far we have presented one option, namely a laser injection diode 910 and 810 in FIG. 8A, for generating the power pulses needed to pump the wavelength converter. Such injection diodes may be either expensive and/or hard to manufacture.

Three other options currently exist to generate pulses. They are a fiber laser, solid state laser, and a micro-laser. Pulse lasers may either be pulsed by modulating the laser pump, passively or actively Q-switched, or actively or actively mode-locked.

Figure 8B:
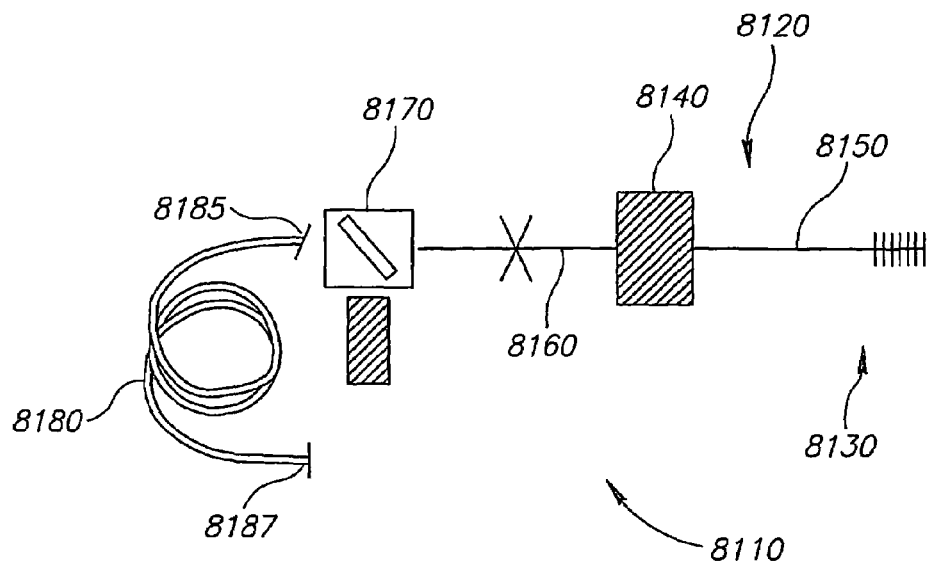
FIGS. 8B-8D are schematic illustrations of three alternative pulse generators to the injection diodes described in reference to FIG. 8A, namely—fiber laser, solid state laser and micro-laser, according to some embodiments of the present invention.

Reference is now made to FIG. 8B. FIG. 8B shows an example of an actively Q-switched fiber laser oscillator 8110 that may be capable of generating short pulses. The cavity 8120 may include a Fiber Bragg Grating (FBG) 8130 which may serve as one end mirror and selects the wavelength. The FBG 8130 may be connected to the Q-switch 8140 via a fiber 8150. Q-switch 8140 may actively or passively modulates the loss in cavity 8120 to cause pulsing. Q-switch 8140 may be of many technologies, including saturable absorber, electro-optic switch, or acoustic-optic switch. In the world of fiber optics, active devices, referred to as intensity modulators and/or EO modulators, may be integrated optical components on a lithium niobate substrate. Q-switch 8140 may be attached to a fiber 8160 which may enter beam combiner 8170, as previously described with reference to FIG. 8A. The lasing fiber 8180 may be located after the beam combiner 8170. In other embodiments a Fiber Bragg Grading (FBG) may be used instead of a second end mirror. The surface 8185 next to beam combiner 8170 may have an angle polish to prevent lasing from this surface. The other end 8187 of lasing fiber 8180 may have a zero degree surface which acts as the other end mirror and output coupler from the Frensel transmission. This particular example may use an active QS 8140. Such a Q-switch may preferably made from BBO or RTP to support high repetition rates. In addition, mode locked fiber lasers may also provide very high repetition rate laser sources (>1 MHz). The laser may be either a single polarization or a random polarization.

Figure 8C:
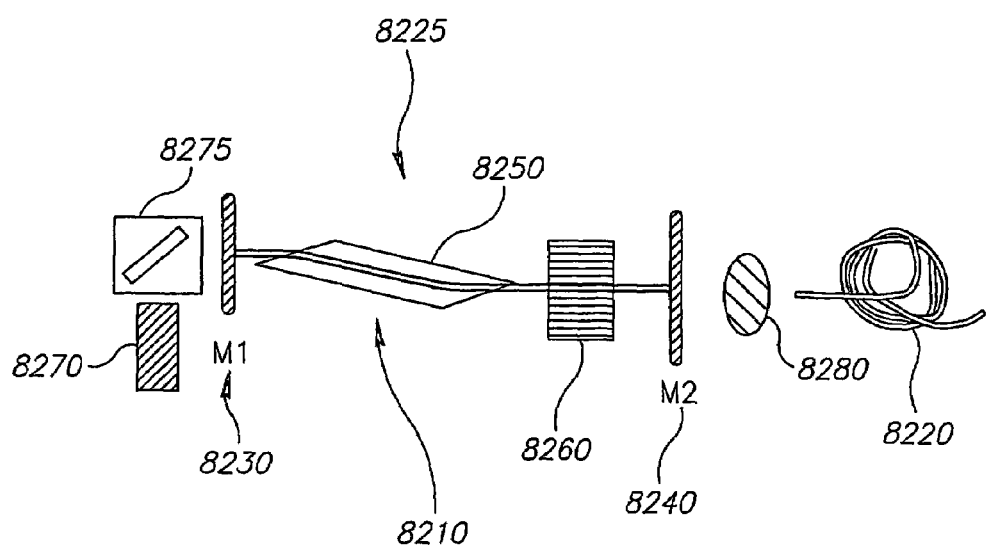

Reference is now made to FIG. 8C. FIG. 8C shows an example of a solid state laser 8210 which may used to seed a fiber amplifier 8220. Only low energy short pulses may be required, so thermal problems that typically are encountered with solid state lasers may be avoided. The cavity 8225 may include two mirrors—8230 and 8240 (also marked as M1 and M2), which may be flat or curved to support the fundamental Gaussian mode. Mirror 8240 may also be the output coupler. In this example, the lasing medium 8250 is Brewster cut to ensure minimum reflection loss and a single polarization operation. However, this laser may also be in a random polarization. Cavity 8225 also contains a Q-switch (QS) 8260, which may be either of the active or passive type. If an active Q-switch is used, it may either be acousto-optic or electro-optic. If electro-optic switch is used, RTP or BBO is the crystal of choice because of the high repetition rates required. Lasing media 8250 may be pumped through mirror 8230 by a pump diode (PD) 8270, which may be connected to combiner 8275. The mode size of pump diode 8270 and of the laser cavity 8225 may be matched to ensure high conversion. The output of laser cavity 8225 may be coupled to fiber 8220 via lens 8280.

Figure 8D:
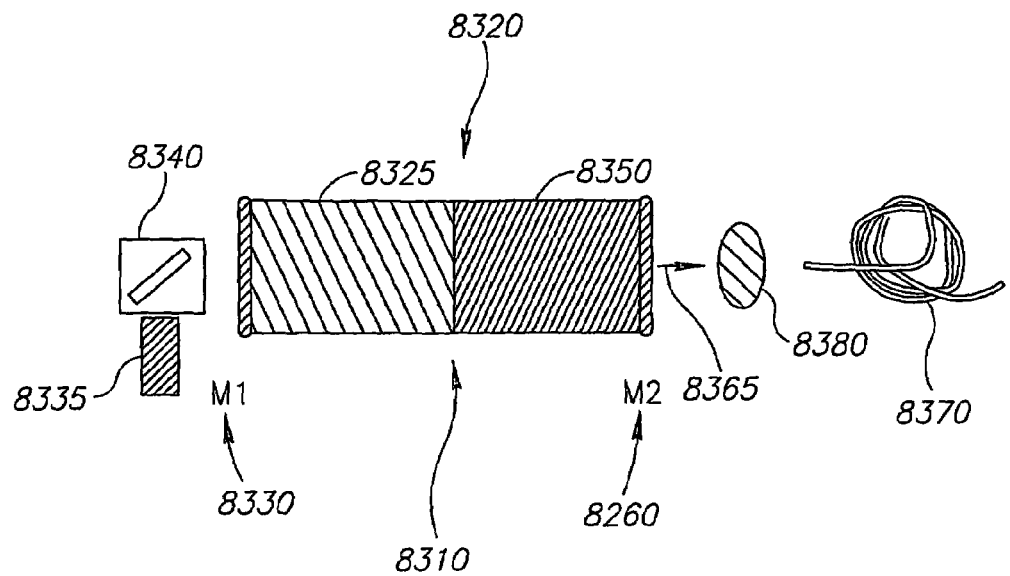

Reference is now made to FIG. 8D. FIG. 8D shows a passively Q-switched micro-laser 8310 capable to serve as the laser oscillator in a DIRCM system in accordance with the present invention. One advantage of a micro-laser is that the cavity 8320 may be a monolithic block of material. Lasing media 8325 may be pumped through a dichroic end mirror 8330 (also marked as M1), by a pump diode (PD) 8335 which may be connected to combiner 8340. Cavity 8320 may include a dichroic end mirror 8330 that may transmit the pump but reflects the lasing radiation. The pump radiation may invert the lasing medium 8325. The fluorescence of the lasing medium 8325 may eventually saturate a passive Q-switch (QS) 8350 and cause it to open. Cavity 8320 may then lase between mirror 8330 and mirror 8360 (also marked M2), which is the output coupler. The beam 8365 may then be directed into a fiber 8370 by a lens 8380. Fiber 8370 may then be directed to the fiber amplifiers (not shown). This laser may either be of single or random polarization.

Figure 9:
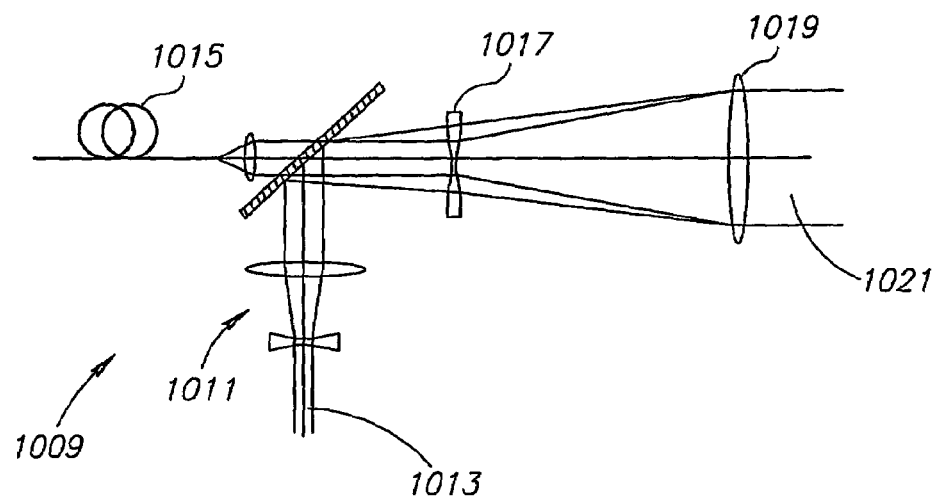
FIG. 9 is a conceptual diagram illustrating one example of a combiner applicable for combining the output beams of the fiber laser means described in FIGS. 7 and 8, according to some embodiments of the present invention.

Reference is now made to FIG. 9. It is a conceptual diagram illustrating one example of a combiner 1009 applicable for combining the output beams of the fiber laser means, described in FIGS. 7 and 8, to be collinear. Such a combiner may be packaged as part of the telescope means (see FIG. 7, element 730), and integrated as part of the laser head unit (see FIG. 2, element 240). In the example depicted in the drawing, an optical array 1011 may combine at least two laser beams 1013 and 1015 that may have arrived from the silica fiber laser pumped ZGP OPO and the ZBLAN fiber laser, and may expend them through beam expender 1017 lens, and collimate the beams through collimating lens 1019, in order to combine them into a collimated beam 1021 capable to be directed into the approaching thermally guided threat.

Any professional skilled in the art will understand that combiner 1009 is just an example and other optical arrays (utilizing for example, mirrors) may be implemented for combining of the output beams to be collinear.

At least two types of an optical parametric oscillators (OPOs) may be used in a DIRCM system in accordance with the present invention—polarization dependent and polarization independent OPOs, where "polarization" refers to the pump beam.

Figure 10:
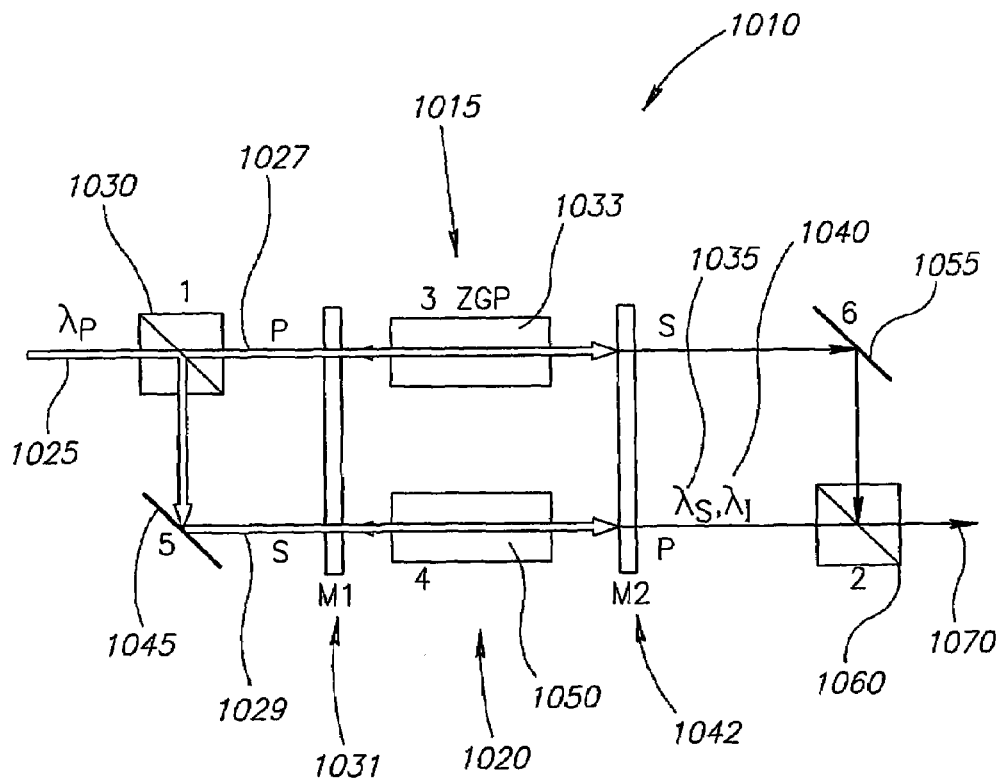
FIG. 10 is a diagram of a pump-polarization dependent OPO suitable to be directly pumped with a fiber laser as described in FIGS. 7 and 8; according to some embodiments of the present invention.

Refer to FIG. 10. The drawing constitutes a diagram of a pump-polarization independent OPO 1010 suitable to be directly pumped with a fiber laser as described in FIGS. 7 and 8. The embodiments utilize two polarization dependent OPOs 1015 and 1020 directly pumped, in accordance with the present invention, with a fiber laser means.

The input pump beam 1025 (marked also as .lamda.p) may be split into two linear polarization states, 1027 and 1029, by a polarizing cube or a thin film polarizer 1030. One polarization state of the pump, designated 1027 (designated also by "P" in the drawing), may enter the OPO cavity 1015 through dichroic mirror 1031 (designated also by "M1" in the drawing). The pump may then enter the nonlinear crystal 1033, in this embodiment ZGP (zinc germanium phosphide) which is oriented and cut in such a way to convert pump beam 1027 into the desired signal and idler beams 1035 and 1040 (designated also as .lamda.S, .lamda.I). In this case, the signal and idler beams 1035, 1040 may have the same polarization, which may be orthogonal to the pump beam.

The pump beam may then reflect off of mirror 1042 (designated also by "M2" in the drawing), for a second pass through crystal 1033. The signal 1035 and idler 1040 may be resonated in cavity 1015 and some of the signal and idler may leak through 1042 (in this case 50%) to leave cavity 1015.

The second polarization state of pump beam 1025, denoted as 1029, may be steered by steering mirror 1045 to enter a second OPO 1020 (in this embodiment, both OPOs may use the same mirrors but different crystals) through mirror 1031. The nonlinear conversion may occur in the nonlinear crystal 1050, which may be oriented and cut in a way to convert this polarization state.

The outputs from both OPOs, 1033 and 1050, may have different polarizations. The output of OPO 1033 may be steered by steering mirror 1055, and these signal and idler (.lamda.$, .lamda.I) beams may be combined using polarizing cube or thin film polarizer 1060 to obtain a single beam 1070.

Any professional skilled in the art will appreciate that this design has a very high conversion efficiency (>60%) since the pump beam passes through the crystal twice.

Reference is now made to FIGS. 11-14. The drawings are diagrams each depicting the design of pump-polarization independent OPO suitable to be directly pumped with a fiber laser as described in FIGS. 7 and 8. Each design (1110, 1210, 1310, and 1410), may convert a randomly polarized input pump beam, while treating the issues of absorption of the pump and phase relation between each polarization state differently.

Figure 11:
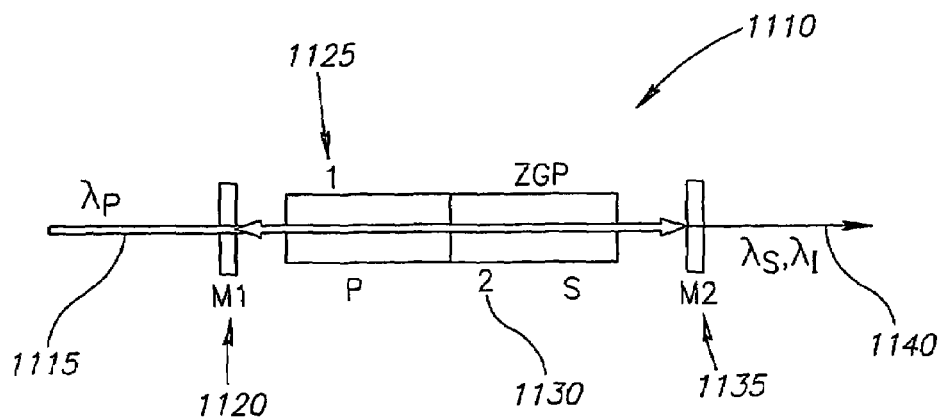
FIGS. 11-14 are diagrams depicting designs of pump-polarization independent OPO, suitable to be directly pumped with a fiber laser as described in FIGS. 7 and 8, according to some embodiments of the present invention. Each design converts a randomly polarized input pump beam, while treating the issues of absorption of the pump and phase relation between each polarization state differently.

The OPO design 1110 shown in FIG. 11 may use a random polarization input pump beam 1115 (also designated as .lamda.p). The pump beam 1115 may enter at mirror 1120 (also designated as M1). Both linear polarization states may enter the first crystal 1125. Only one polarization state of the pump (marked "P") may be converted in this crystal. The pump may then enter the second crystal 1130 that converts the second Polarization State of the pump (marked "S"). The pump may then be reflected back by mirror 1135 (also designated as M2) for a second pass through each crystal 1130 and 1125. The signal and idler (.lamda.S, .lamda.I) generated in crystal 1125 may have the same polarizations, which may be orthogonal to the signal and idler (.lamda.S, .lamda.I) beam polarizations generated in crystal 1130, which also have same polarizations. For this reason, the nonlinear processes for each polarization of the pump beam may occur in separate crystals, since they may be independent. The output polarization 1140 of this OPO may be random like the pump.

Any professional skilled in the art will appreciate that this OPO design has a minimum number of parts to align. It may consist of, for example, only two crystals, 1125 and 1130 and two mirrors, 1120 and 1135. The nonlinear conversion processes for each polarization state may occur in different crystals independently, and the design may be capable of handling both low and high pulse energies. However, if the crystals absorb the pump, the conversion may lose efficiency due to pump absorption: the pump must pass through a crystal before being converted. The "S" polarization must pass through crystal 1125, in which part of the energy may be absorbed, before being converted in crystal 1130.

Figure 12:
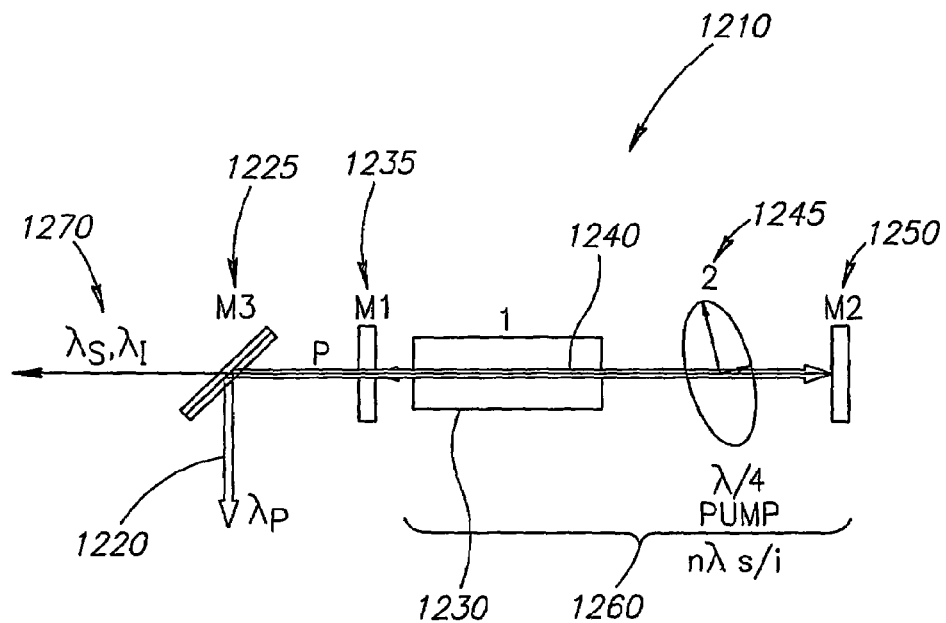

Referring to embodiment 1210 depicted in FIG. 12, one should appreciate that this embodiment requires only one nonlinear crystal, wherein the crystal tends to be a rather expensive element in the OPO system.

The pump beam 1220 may be incident on a dichroic mirror 1225 (designated also as "M3") that reflects the beam into the OPO 1230. The pump beam may enter at mirror 1235 ("M1"). One polarization state of the pump may be converted within the nonlinear crystal 1240. The other polarization passes through crystal 1240, although some of it is absorbed. The pump may then pass through quarter waveplate 1245 and may reflect off of mirror 1250 ("M2"). After passing through quarter waveplate 1245 again, the pump may now have an orthogonal polarization state which may generate the signal and idler beams. The signal and the idler beams are resonated in the cavity 1260, and coupled out at 1235(M1). Mirror 1225 (M3) may pass the signal and idler beams 1270 (.lamda.S, .lamda.I) and reflect the pump.

There may be multiple embodiments of the quarter waveplate 1245. A first embodiment may be of a quarter waveplate for only the pump. The signal and idler are unspecified. The signal and idler may rotate at unspecified angles, which may tend to decrease the efficiency since the phases may not be aligned with the pump.

A second embodiment may be of a quarter waveplate for the pump and the signal and idler. This is the same case as a two independent OPOs with a single pass pump beam. This design may be more suitable for high-energy pulses that may only need one pass through the crystal to experience high conversion efficiency. The quarter waveplate may be replaced with a periscope or a babinet compensator if the OPO is a ring cavity. These elements make a half-wave rotation.

A third embodiment may be a quarter waveplate for the pump, and half-wave plate (any integer multiple) for the signal and the idler. In this case, the pump polarization may be rotated 90 degrees on each round trip, and the signal and idler polarizations may not be rotated. In this way, different polarization states of the pump may amplify the same polarization states of the signal and idler.

As mentioned above, any professional skilled in the art will appreciate the fact that this OPO is relatively simple to align and contains only one crystal.

Figure 13:
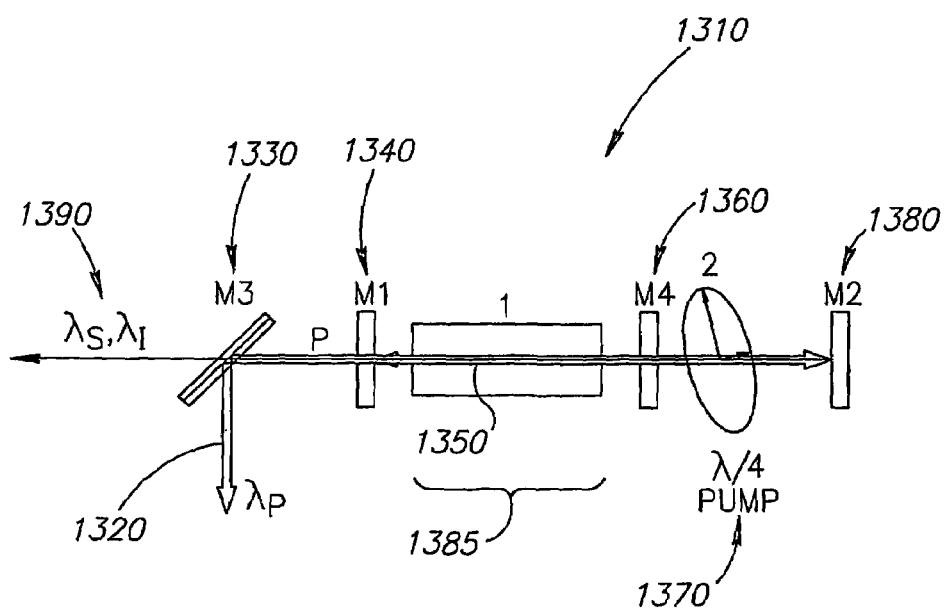

Reference is now made to FIG. 13. In this embodiment, the OPO 1310 uses the different pump polarizations to amplify the same signal and idler. Pump beam 1320 may be incident on a dichroic mirror 1330 ("M3") which may reflect the beam into OPO 1310. Pump beam 1320 may enter at mirror 1340 ("M1"). One polarization state of the pump is converted within nonlinear crystal 1350. The other polarization may pass through the crystal, although some of it may be absorbed. The pump may then pass through mirror 1360 ("M4"). The signal and idler may be reflected off of this mirror. The pump may then pass through quarter waveplate 1370 and may reflect off of mirror 1380 ("M2"). After passing through quarter waveplate 1370 again, the pump may now have an orthogonal polarization state which may generate the signal and idler beams. The signal and the idler beams may be resonated in the cavity 1385 with end mirrors 1340 and 1360 (between "M1" and "M2"), and may be coupled out at 1340 ("M1"). Dichroic mirror 1330 ("M3") may pass the signal and idler beams 1390 and may reflect the pump.

Any professional skilled in the art will understand that this design uses a single nonlinear crystal and both polarization states of the pump are used. In addition, since each polarization only passes through the crystal once, this design is more suitable for high-energy pulses.

Figure 14:
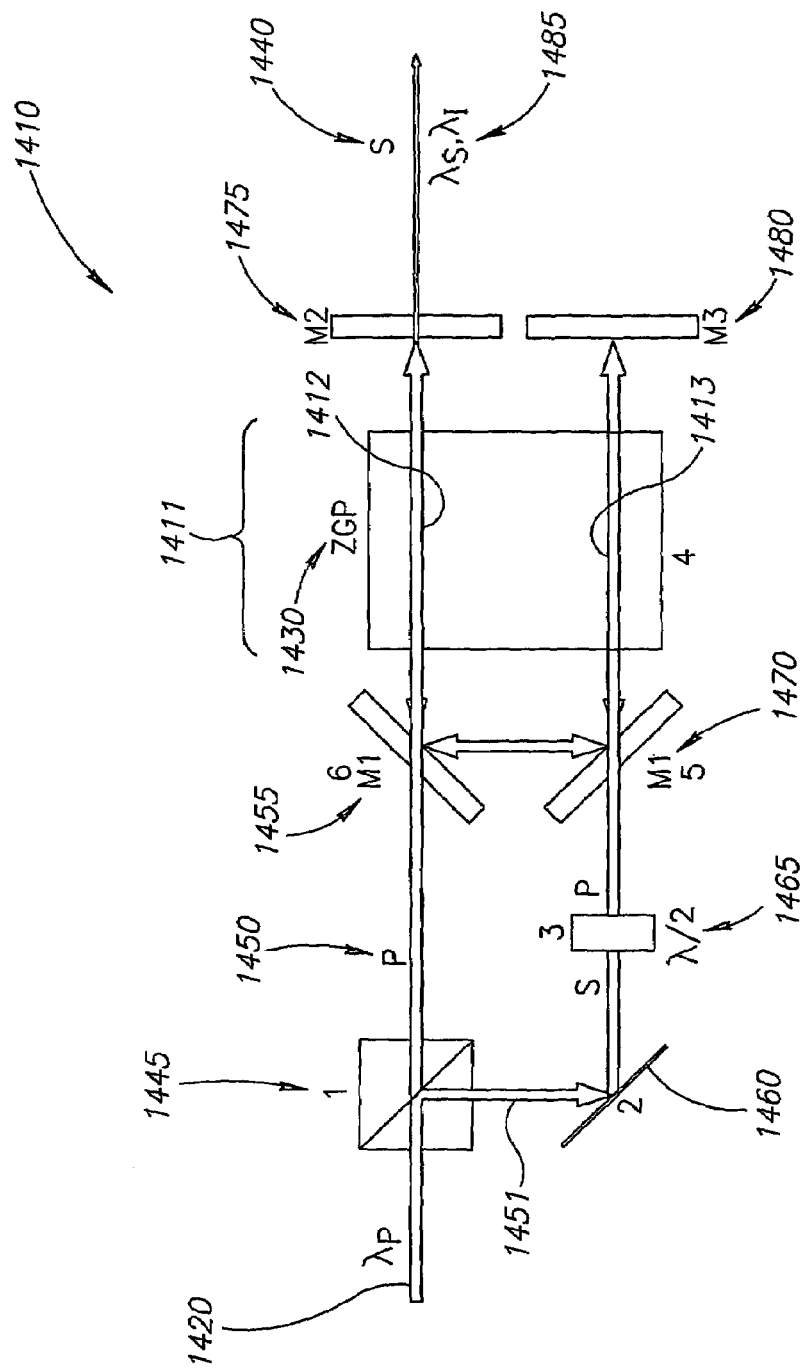

Reference is now made to the embodiment depicted in FIG. 14. In this embodiment, a single OPO 1410 may be pumped twice by each pump polarization. The pump beam 1420 (.lamda.p) may only pass through the crystal 1430 when it is able to amplify the signal and idler beam. In addition, the output beams 1440 (.lamda.s. .lamda.I) may be polarized with the same polarization state.

The pump beam 1420 (.lamda.p) may enter a polarizing cube or thin film polarizer 1445 to split the polarizations. One polarization 1450 may enter the OPO cavity 1411 through mirror 1455 (M1). The second pump polarization 1451 may be reflected from a steering mirror 1460 and may then pass through a half-wave plate 1465, which may rotate the polarization to the other state. The beam 1451 may then enter the OPO cavity 1411 through mirror 1470. Thus, OPO 1410 may be pumped by the same polarization state in the upper and lower arms, 1412 and 1413, between mirrors 1455 and 1475 and between mirrors 1470 and 1480 respectively. The pump in each arm (M1-M2 and M1-M3) may make two passes through the single nonlinear crystal 1430. The signal and idler 1485 are coupled out of the cavity at mirror 1475.

Any professional skilled in the art will appreciate that in accordance to this embodiment, each pump beam passes twice through the crystal giving more amplifying passes. This is especially suitable for low energy pulses.

Figure 15:
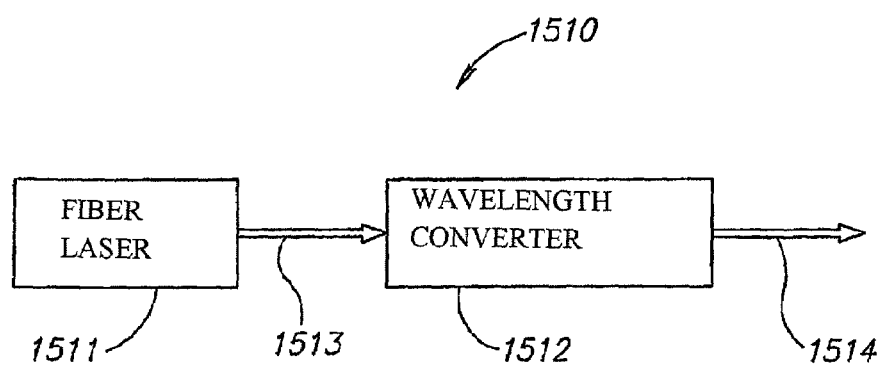
FIG. 15 is a schematic diagram of wavelength conversion implemented for producing the desired wavelengths; according to some embodiments of the present invention.

Refer to FIG. 15. The drawing is the general scheme of wavelength conversion 1510 implemented for producing the desired wavelengths. A fiber laser means 1511 may be used to produce a wavelength 1513. This wavelength 1513 may drive a wavelength converter 1512 that may produce a single or multi-spectral output 1514.

The fiber laser means may be a Er/Yb: silica fiber, Yb: silica fiber, Tm: silica, Tm/Ho: silica fiber, Tm: ZBLAN fiber, or Tm/Ho: ZBLAN or any combination thereof (Any person skilled in the art would understand the use of Yb/Ho: silica and Yb/Ho: ZBLAN for all places where Tm/Ho: ZBLAN is mentioned). The fibers may be polarization independent, polarization maintaining, or large mode area Wavelength converter 1512 may consist of only an optical parametric oscillator (OPO) as described above with reference to FIGS. 10-14, a single OPO cavity with one or more crystals that may produce multiple wavelengths, upconverters such as a converter to generate the second harmonic, upconverting lasers such as Tm:ZBLAN which is pumped by a Yb:silica fiber laser, a frequency converter using Raman amplification or four-wave mixing, optical parametric generator (OPG) and an optical parametric amplifier (OPA), and OPO and an OPA, or an OPA or OPO seeded by another source, such as a laser diode (not shown). In addition, each of these converters may be connected in series to obtain the final wavelength. The nonlinear crystal used in the wavelength converter may be a periodically poled crystal with transparency at a pre-defined wavelength, such as PPLN or PPLT possible in stoichiometric forms with or without MgO doping, or birefringence crystals such as AGS or AGSE.

In some embodiments of the present invention, a bulk laser may be used to convert the generated wavelength. Since high power laser diodes are not available at all wavelengths, a fiber laser may be used to convert the pump energy from laser diodes into pump energy at another wavelength that a different laser material can utilize. In embodiments where fiber laser is used as the pump source, fiber laser pumped bulk laser, for example Tm:silica fiber laser, may be used to pump, for example, Ho:YAG, Ho:YLF, Ho:YA103, to achieve either SW or LW source either independently or with the use of another wavelength converter. For example, according to some embodiments, Tm:silica fiber may be used to pump a bulk Ho:YLF laser which may be used to pump a ZGP OPO. In some embodiments, a fiber laser may be used to pump a holmium doped material to achieve either SW or LW source, either independently or with the use of at least one wavelength converter.

Reference is now made to FIGS. 16-21. The drawings are diagrams each depicting design of additional fiber based laser means applicable for the DIRCM system.

Figure 16:
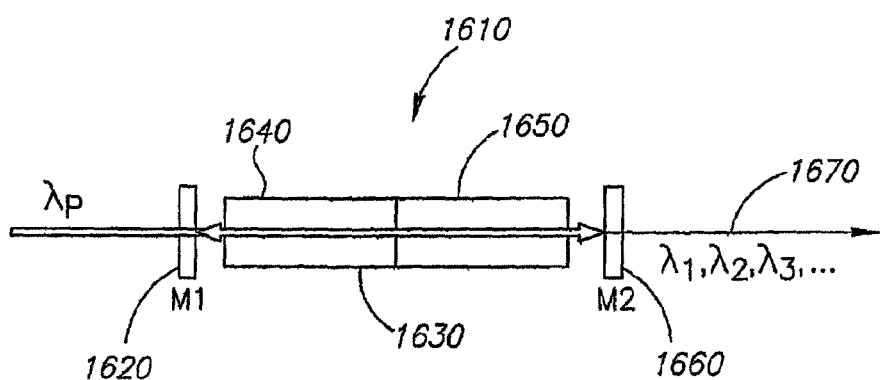
FIGS. 16-21 are diagrams each depicting schematic designs of additional fiber based laser means applicable to the DIRCM system, according to some embodiments of the present invention.

Reference is now made FIG. 16, which is a schematic illustration of an embodiment of Yb:silica fiber pumped dual crystal OPO 1610. Diode pumped Yb:silica fiber lasers are a mature technology with high overall efficiency. Recent advancements have made it possible to produce a single linear polarization from these lasers, which is ideal to pump an OPO. One possible way to convert light with one wavelength to second wavelength is shown in FIG. 16. In this case, a signal polarization Yb:silica fiber laser (not shown) is used to pump a PPLN (periodically poled lithium niobate) OPO 1610 to generate the desired wavelengths. The pump beam may be incident on mirror 1620 (also marked M1), which may completely transmit the pump and reflect all of the wavelengths generated inside of the cavity 1630. In the first crystal 1640, the pump wavelength may be converted from first wavelength band to a second wavelength band (e.g.—from 1.mu.m to band I). The second crystal 1650 may have the appropriate poling period to convert the second wavelength to a third wavelength (e.g.—from band I to band IV). The pump beam may then be completely reflected by mirror 1660 (also defined as M2). Mirror 1660 may act as an output coupler for the desired output wavelengths 1670 (also marked as .lamda..lamda.1, .lamda.2, .lamda.3,). The intermediate conversion of the first wavelength to the second one (e.g.—from 1.mu.m to band I), may increase the overall light conversion efficiency (e.g.—from 1.mu.m to band IV). In addition, many and any wavelengths may be generated in the bands of interest simultaneously with this design (e.g.—band I, band II and band IV, in any combination,). In addition, a random polarization pump laser beam may be used with similar OPO designs shown previously in this disclosure.

Figure 17:
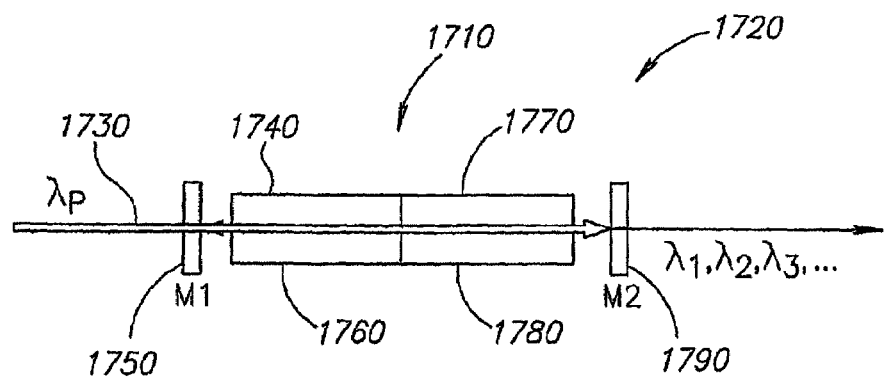

Reference is now made to FIG. 17. FIG. 17 is a schematic illustration of Er/Yb:silica fiber pumped dual crystal OPO 1710. Er/Yb:silica fiber lasers are also a mature technology. These lasers may produce wavelengths centered on pre-defined wavelength (e.g.—around 1.56.mu.m). In certain applications, since the wavelength is closer to the requested band (e.g.—band II-band IV), than Yb fiber lasers, this solution may offer a more efficient generation scheme. One embodiment of converter 1720 is shown in FIG. 17. In this case, the input pump beam 1730 (also designated as .lamda.p) may be produced from a random polarization state Er/Yb:silica fiber laser (not shown). The pump may enter the OPO cavity 1740 through mirror 1750 (also designated as M1). The first crystal 1760 may convert one polarization of pump light directly to the desired wavelength (e.g.—from 1.55.mu.m to band IV). The second crystal 1770 may be identical to the first crystal 1760 except that it may be rotated 90 degrees about the optical axis 1780 to convert the other polarization of the pump beam. The pump may then be reflected off of mirror 1790 (also marked as M2). The light (e.g.—at band IV) may be partially reflected back into cavity 1740 and the remaining light may be transmitted through mirror 1790.

Figure 18:
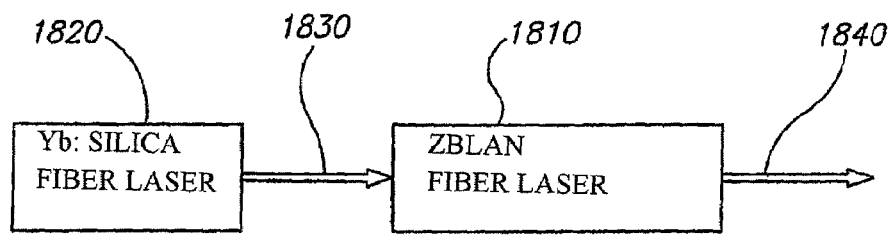

Reference is now made to FIG. 18. FIG. 18 depicts one embodiment of pumping a Tm/Ho: ZBLAN or Tm: ZBLAN fiber laser 1810 by a Yb: silica fiber laser 1820 to produce certain pre-defined light by upconversion (Any person skilled in the art would understand the use of Yb/Ho: silica and Yb/Ho: ZBLAN for all places where Tm/Ho: ZBLAN is mentioned).

In some DIRCM applications there may be a need for Non-Ionizing Radiation (NIR) sources: wavelengths between 700-900 nm. One way to achieve these wavelengths may be to use an upconversion process that, for example, may occur in Tm/Ho:ZBLAN or Tm:ZBLAN when it is pumped with a certain wavelength (e.g.—1064 nm). In the schematic shown in FIG. 18, a Yb:silica fiber 1820 pump a Tm/Ho:ZBLAN or Tm:ZBLAN fiber laser 1810 with certain wavelength 1830 (e.g.—1064 nm) designed to lase around a second pre-defined wavelength 1840 (e.g.—800 nm). The mirrors (not shown) may be selected such that this wavelength resonates in the fiber 1810.

Figure 19:
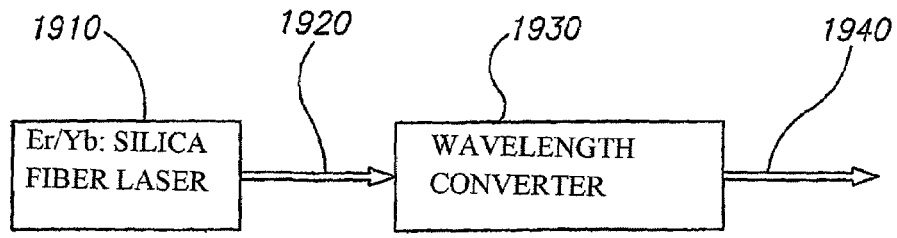

Another way to obtain wavelengths in the NIR (e.g.—700-850 nm), is to do second harmonic generation of an Er/Yb: silica fiber laser. The general schematic is shown in FIG. 19. In this case, the fiber laser 1910 is an Er/Yb:silica fiber laser with either random or specified polarization. The beam 1920 may then enters a wavelength converter 1930, which in this case may be a PPLN OPO specifically designed for second harmonic generation 1940 (e.g.—780 nm from 1560 nm).

Figure 20:
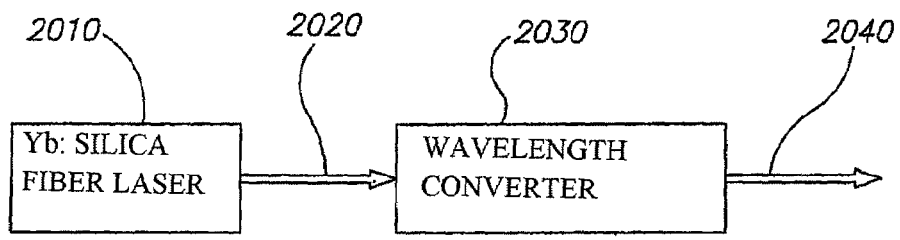

In some DIRCM applications, there may also be a need to produce bright sources of visible light (e.g.—450-650 nm), specifically green and yellow light. Second harmonic generation of Yb:silica fiber lasers is ideally suited for this task. The general solution is shown in FIG. 20. In this case, the fiber laser 2010 may be a Yb:silica fiber laser with either random or specified polarization. The beam 2020 then enters a wavelength converter 2030, which in this case could be a PPLN OPO specifically design for producing specific second harmonic generation light 2040 (e.g.—from 1064 nm to 532 nm).

Figure 21:
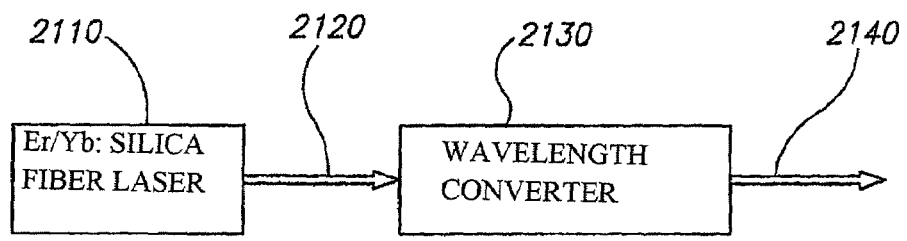

Third harmonic generation of Er/Yb:silica fiber lasers may also be used to produce visible light (e.g.—500-600 nm). The general idea is shown in FIG. 21. In this case, the fiber laser 2110 is an Er/Yb:silica fiber laser with either random or specified polarization. The beam 2120 may then enters a wavelength converter 2130, which in this case may be a PPLN OPO specifically design for producing specific third harmonic generation light 2140 (e.g.—from 1560 nm to 520 nm).

Figure 22:
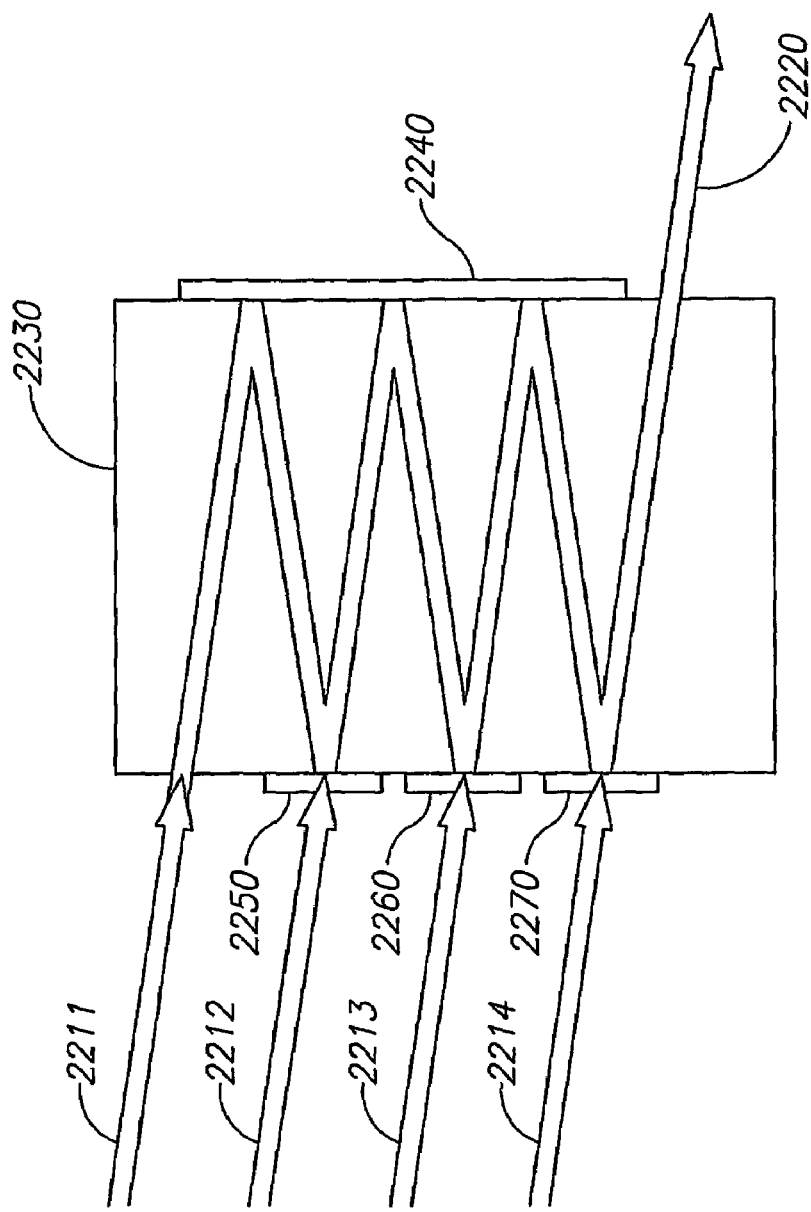
FIG. 22 is a schematic example of a multi-spectral beam combiner for producing a multi-spectral source, according to some embodiments of the present invention.

Reference is now made FIG. 22, which is a schematic example of a multi-spectral beam combiner implemented for producing multi-spectral source. The laser means described hereinabove in reference to FIGS. 7-14 and the additional potential embodiments described hereinabove in reference to FIGS. 15-21 may be combined to yield a multi-spectral high brightness source for the required jamming beam. The previous disclosure provided in reference to FIGS. 7-14 showed one solution for combining two beams of different wavelengths: a dichroic mirror was used to reflect one wavelength and to transmit the second to yield a two-color beam. The additional embodiment, hereinafter described, expands the capabilities of DIRCM system designed in accordance with the invention, to include a system output of one to many colors.

One embodiment of a multi-spectral beam combiner is shown in FIG. 22. In this example, four collimated beams 2211, 2212, 2213 and 2214, of different wavelengths may be combined to yield a collinear multi-spectral beam 2220. The combiner 2230 may include a sapphire block, or other material transparent to all wavelengths, coated with several mirrors of different properties. Mirror 2240 may be a high reflector for all incident wavelengths. Mirror 2250 may transmit wavelength 2212 but reflects wavelength 2211. Mirror 2260 may transmit wavelength 2213 but reflects wavelengths 2211 and 2212. Mirror 2270 may transmit wavelength 2214 but may reflect wavelengths 2211, 2212, and 2213. As is shown in the drawing, one wavelength may be added for each bounce of beam 2220 off of the mirrors 2250, 2260, and 2270.

Other combiner technologies based on polarization combining or dispersive elements—diffraction gratings, prisms, array-waveguides, etc.—may also allow for multi-spectral combining.

Embodiments of the present invention are not restricted to one or another aerial configuration, and, as any professional skilled in the art would appreciate, embodiments may be implemented in any arena, be it air, sea or ground or any combination thereof.

It will be appreciated by persons who are skilled in the art, that the present invention is not limited by what has been particularly shown and described above. Rather, the scope of the present invention is only defined by the claims which follow.

The invention claimed is:

1. A DIRCM (Direct IR Counter Measures) system comprising:
   detection means for detecting an approaching vessel that might pose a threat to a mobile platform to which said system is allocated; acquisition means to generate position-related data of said approaching vessel; fiber laser means to generate a multi-spectral laser beam having one or more bands for jamming a homing means of said vessel; and a movable turret means, coupled with said laser means to direct said laser beam towards said vessel.

2. A DIRCM system in accordance with claim 1, further comprising warning means to generate a warning when a threatening vessel is detected.

3. A DIRCM system in accordance with claim 2, wherein said fiber laser means includes a Er/Yb: silica fiber laser to produce a first wavelength by third harmonic generation and to produce at least one additional wavelength to be combined with said first wavelength, to provide a multi-spectral source for generating said laser beam.

4. A DIRCM system in accordance with claim 1, wherein said acquisition means calculates an updated position of the approaching vessel in real time.

5. A DIRCM system in accordance with claim 1, further comprising processing means being associated with said detection means, said acquisition means, said fiber laser means and said moveable turret means.

6. A DIRCM system in accordance with claim 1, wherein said platform to which said system is allocated is selected from one platform of a group consisting of an aircraft, vehicle, armored vehicle, tank, and ship.

7. A DIRCM system in accordance with claim 1, further comprising means for mounting said system on said platform.

8. A DIRCM system in accordance with claim 1, further comprising warning means including a sensor selected from a group consisting of an IR sensor, UV sensor, visible light sensor, radar sensor or of any combination of said sensors.

9. A DIRCM system in accordance with claim 1, wherein said acquisition means includes a FLIR device.

10. A DIRCM system in accordance with claim 1, wherein said laser beam is a dual wavelength beam.

11. A DIRCM system in accordance with claim 1, further comprising a telescope means for collimating a plurality of beams from said multi-spectral beam.

12. A DIRCM system in accordance with claim 1, wherein said fiber laser means comprises: a fiber laser pumped bulk laser for providing a first wavelength beam; and a LW Tm: silica fiber laser pumped ZGP (zinc germanium phosphide) OPO (optical parametric oscillator) array for providing a second wavelength beam.

13. The system of claim 12, wherein said fiber laser means comprises a holmium doped material that when pumped by said fiber laser generates at least one of a SW or LW laser beam.

14. A DIRCM system in accordance with claim 1, wherein said fiber laser means comprises:
- a laser generator assembly mounted at a position away from said turret means
- an array of flexible fibers coupled to said laser generator, to direct said laser beam from said laser generator towards said turret means; and
- a laser head unit linked to said fibers array.

15. A DIRCM system according to claim 14, further comprising a wavelength converter in said turret means.

16. A DIRCM system according to claim 14, wherein said array of flexible fibers includes polarization maintaining fibers.

17. A DIRCM system according to claim 14, wherein said array of flexible fibers includes single polarization fibers.

18. A DIRCM system in accordance with claim 14, wherein said turret means includes an array of optical lenses and mirrors, linked to said laser head, to route said laser beam within said turret means.

19. A DIRCM system in accordance with claim 14, wherein said laser head unit is mountable in said turret means and said laser beam is generated from within said turret means.

20. A DIRCM system in accordance with claim 1, wherein said fiber laser means includes a silica type fiber laser to directly pump a ZGP (zinc germanium phosphide) OPO (optical parametric oscillator).

21. A DIRCM system in accordance with claim 20, wherein said OPO is pump-polarization independent.

22. A DIRCM system in accordance with claim 20, wherein said OPO is pump-polarization dependent.

23. A DIRCM system in accordance with claim 1, wherein said fiber laser means includes a Tm: silica fiber, which is used to pump a bulk Ho: YLF laser, which is used to pump a ZPG OPO.

24. A DIRCM system in accordance with claim 1, wherein said fiber laser means includes at least one fiber laser selected from a group consisting of:
- Yb: silica fiber laser, Er/Yb: silica fiber laser, Tm/Ho: ZBLAN fiber laser, Yb/Ho: silica fiber laser, Yb/Mo: ZBLAN fiber laser, Tm: ZBLAN fiber laser,
- Tm: silica fiber laser, Tm/Ho: silica fiber laser, Er: silica fiber laser, Nd: silica fiber laser and
- Nd/Yb: silica fiber laser for producing a beam of a first wavelength; and at least one fiber laser to provide at least one beam of an additional wavelength combined with said beam of a first wavelength, thereby providing a multi-spectral source for generating said laser beam.

25. A DIRCM system in accordance with claim 1, wherein said fiber laser means includes a Yb: silica pumped Tm: ZBLAN laser to produce a first wavelength by upconversion.

26. A DIRCM system in accordance with claim 1, wherein said fiber laser means includes a Yb: silica pumped Tm/Ho: ZBLAN laser to produce a first wavelength by upconversion.

27. A DIRCM system in accordance with claim 1, wherein said fiber laser means includes a Er/Yb: silica fiber laser to produce a first wavelength by second harmonic generation and to produce at least one additional wavelength to be combined with said first wavelength, to provide a multi-spectral source for generating said laser beam.

28. A DIRCM system in accordance with claim 1, wherein said fiber laser means includes a Yb: silica fiber laser to produce a first wavelength by second harmonic generation and to produce at least one additional wavelength to be combined with said first wavelength, to provide a multi-spectral source for generating said laser beam.

29. A DIRCM system in accordance with claim 1, wherein said fiber laser means includes: at least one fiber laser taken from a group consisting of:
- Yb: silica fiber laser, Tm/Ho: ZBLAN fiber laser, Tm: silica fiber laser, Tm/Ho: silica fiber laser, Er: silica fiber laser, Er/Yb silica fiber laser and Nd/Yb: silica fiber laser; and a wavelength converter; wherein said fiber laser pumps said wavelength converter to produce a first wavelength and wherein said first wavelength is combined with at least one additional wavelength to provide a multi-spectral source for generating said laser beam.

30. A DIRCM system in accordance with claim 29, wherein said wavelength converter is at least one converter selected from the group consisting of an OPO, an OPO with multiple crystals, a series of OPOs, a seeded OPO, an OPO and OPA, a combination of OPG and OPA, a seeded OPA, a four wave mixing amplifier, a bulk laser, and a Raman amplifier.

31. A DIRCM system in accordance with claim 1, wherein said fiber laser means produces a collinear multi-spectral high brightness source comprised of a plurality of bands of laser radiation.

32. A DIRCM system in accordance with claim 1, wherein said laser means is single polarized.

33. A DIRCM system in accordance with claim 1, wherein said laser means is randomly polarized.

34. A DIRCM system in accordance with claim 1, wherein said laser means is not polarized.

35. A DIRCM system in accordance with claim 1, wherein said fiber laser means are included within said movable turret.

36. A DIRCM system in accordance with claim 1, wherein said laser beam includes a plurality of wavelengths enabling simultaneous multi band jamming.

37. A DIRCM system in accordance with claim 1, wherein said laser beam includes any jamming-suitable single wavelength band of at least one available wavelength band implemented either independently from, or sequentially with, another wavelength band.

38. A DIRCM system in accordance with claim 1, wherein said laser beam corresponds to at least one wavelength selected from the group consisting of ultraviolet radiation, visible light, and infrared radiation.

39. A DIRCM system in accordance with claim 1, wherein said laser means is pulsed, and wherein pulse rate, pulse duration and pulse wavelength are set by at least one injection diode that is connected to a fiber.

40. A DIRCM system in accordance with claim 1, wherein said laser means is pulsed, and further including at least one pulse generator selected from the group consisting of fiber lasers, solid state lasers and micro-lasers.

41. A DIRCM system in accordance with claim 1, wherein said laser means generates 3-5 μm radiation independently of an OPO.

42. A DIRCM system in accordance with claim 1, wherein said laser means generates a narrow multi-spectral IR jamming beam.

43. A DIRCM system in accordance with claim 1, wherein a first beam of said multi-spectral beam is a pulsed radiation beam in band I and a second beam of said multi-spectral beam is a pulsed radiation beam in band IV.

44. A DIRCM system in accordance with claim 1, wherein said fiber laser means includes one or more fibers selected from the group consisting of Er/Yb: silica fiber, Yb: silica fiber, Tm: silica, Tm/Ho: silica fiber, Tm: ZBLAN fiber, and Tm/Ho: ZBLAN.

45. A DIRCM system in accordance with claim 1, wherein said fiber laser means includes a short wavelength ZBLAN device to generate pulsed radiation beam in band I.

46. A DIRCM system in accordance with claim 1, wherein said fiber laser means includes a long wavelength ZGP device to generate pulsed radiation beam in band IV.

47. A DIRCM system in accordance with claim 46, wherein said ZGP device includes a fiber laser device of a long wavelength silica fiber laser and a nonlinear crystal Zinc Germanium Phosphide (ZPG) Optical Parametric Oscillator (OPO) directly coupled to said silica fiber laser.

48. A DIRCM system in accordance with claim 1, wherein said fiber laser means comprises: ZBLAN fiber laser to provide a first wavelength beam, and a LW Yb:silica fiber laser pumped PPLN or PPSLT (periodically poled lithium niobate or periodically poled stiochiometric lithium tantalate) OPO (optical parametric oscillator) array to provide a second wavelength beam.

49. A DIRCM system in accordance with claim 1, wherein said fiber laser means comprises fiber laser pumped bulk Ho:YAG laser to provide a first wavelength beam; and a LW Yb:silica fiber laser pumped PPLN or PPSLT (periodically poled lithium niobate or periodically poled stiochiometric lithium tantalate niobate) OPO (optical parametric oscillator) array to provide a second wavelength beam.

50. A DIRCM system in accordance with claim 1, wherein said fiber laser means comprises fiber laser pumped bulk Ho:YLF laser to provide a first wavelength beam; and a LW Yb:silica fiber laser pumped PPLN or PPSLT (periodically poled lithium niobate or periodically poled stiochiometric lithium tantalate niobate) OPO (optical parametric oscillator) array to provide a second wavelength beam.

51. A DIRCM system in accordance with claim 1, wherein said fiber laser means comprises: a fiber laser pumped OPO selected from the group consisting of PPKTP, PPSLT, and PPLN to provide a first wavelength beam; and a LW Yb:silica fiber laser pumped PPLN or PPSLT (periodically poled lithium niobate or periodically poled stiochiometric lithium tantalate niobate) OPO (optical parametric oscillator) array to provide a second wavelength beam.

52. A DIRCM system in accordance with claim 1, wherein said fiber laser means include one or more nonlinear crystals selected from the group consisting of silver gallium selenide (AGSE), optically patterned gallium arsenide, periodically poled lithium niobate or tantalate doped with magnesium oxide or in the stiochiometric form, and silver thiogallate (AGS).

53. A DIRCM system in accordance with claim 1, wherein said fiber laser means includes a Tm: silica fiber, which is used to pump a bulk Ho: YAG laser, which is used to pump a ZGP OPO.

54. A method for jamming homing means of a vessel posing a threat to a mobile platform, the method comprising:
- detecting an approaching vessel;
- acquiring data related to the position and movement of said approaching vessel;
- generating a laser beam from a fiber laser, said laser beam being a multi-spectral beam having one or more bands for jamming the homing means of said approaching vessel; and
- directing said laser beam towards said approaching vessel to jam said homing means of said vessel.

* * * * *